US008698346B2

(12) United States Patent  (10) Patent No.: US 8,698,346 B2
Kamaga  (45) Date of Patent: Apr. 15, 2014

(54) VEHICLE ABNORMALITY DETECTION APPARATUS AND VEHICLE

(75) Inventor: Ryuichi Kamaga, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 493 days.

(21) Appl. No.: 12/811,889

(22) PCT Filed: Sep. 22, 2008

(86) PCT No.: PCT/JP2008/067063
§ 371 (c)(1),
(2), (4) Date: Jul. 7, 2010

(87) PCT Pub. No.: WO2010/032320
PCT Pub. Date: Mar. 25, 2010

(65) Prior Publication Data
US 2011/0181104 A1  Jul. 28, 2011

(51) Int. Cl.
*B60L 1/00* (2006.01)
(52) U.S. Cl.
USPC ........... 307/9.1; 307/10.7; 320/107; 320/128; 320/137; 320/162; 320/166
(58) Field of Classification Search
USPC .......................................................... 307/9.1
See application file for complete search history.

(56) References Cited

U.S. PATENT DOCUMENTS 5,495,908 A * 3/1996 Obara et al. ................. 180/65.8

FOREIGN PATENT DOCUMENTS

| JP | A-05-276676 | 10/1993 |
|----|-------------|---------|
| JP | A-11-205909 | 7/1999 |
| JP | A-2007-236173 | 9/2007 |

OTHER PUBLICATIONS

International Search Report issued in International Application No. PCT/JP2008/067063; mailed on Dec. 16, 2008 (with English-language translation).

* cited by examiner

*Primary Examiner* — Stephen W Jackson
*Assistant Examiner* — Toan Vu
(74) *Attorney, Agent, or Firm* — Oliff PLC

(57) ABSTRACT

A vehicle having an electricity accumulator for driving a vehicle, a charging inlet for receiving power supplied from a power supply provided on the outside of the vehicle, a circuit for charging the electricity accumulator with power from the power supply, and power lines for connecting the charging inlet and the charging circuit. An abnormality detector of vehicle having a circuit for applying a test voltage to the power lines, and an ECU as a short circuit detecting section. When the voltage value of the power line deviates from a predetermined normal range including the test voltage value although the test voltage is applied to the power line from the voltage application circuit, the ECU detects short circuit of the power line. The ECU specifies a short circuit mode corresponding to the detected short circuit among a plurality of short circuit modes based on the voltage value of the power line.

10 Claims, 14 Drawing Sheets

VEHICLE ABNORMALITY DETECTION APPARATUS AND VEHICLE

TECHNICAL FIELD

The present invention relates to an abnormality detection apparatus for a vehicle and to a vehicle, and particularly to a technique for detecting an abnormality of a charging system for charging a power storage device mounted on a vehicle by supplying electric power from a power supply external to the vehicle.

BACKGROUND ART

In recent years, electric vehicles, hybrid vehicles, fuel cell vehicles and the like have received attention as environmentally-friendly vehicles. These vehicles are each mounted with a motor that generates driving force for the vehicle to travel as well as a power storage device that stores electric power to be supplied to the motor. The hybrid vehicle is mounted with an internal combustion engine as a motive power source, in addition to the motor. The fuel cell vehicle is mounted with a fuel cell as a direct current (DC) power supply for driving the vehicle.

A vehicle is known in which a vehicle-mounted power storage device for driving the vehicle can be charged from a power supply for ordinary households. For example, a power supply outlet provided at a house is connected to a charging inlet provided at the vehicle by using a charging cable, so that electric power is supplied from the power supply for ordinary households to the power storage device. In the following, a vehicle in which a vehicle-mounted power storage device can be charged from a power supply provided externally to the vehicle will also be referred to as "plug-in vehicle".

Japanese Patent Laying-Open No. 11-205909 (Patent Document 1) for example discloses a charging apparatus for charging a battery of an electric vehicle by means of an external power supply. According to this document, an electrical leakage breaker is provided between the electric vehicle and an outlet for the external AC power supply. The electrical leakage breaker is provided with a Hall sensor for detecting electrical leakage, a detection circuit and an electrical leakage relay. The electrical leakage breaker is further provided with an electrical leakage test relay for forcing a charging circuit to be short-circuited before charging, and an electrical leakage resistor. In a charging process, the electrical leakage test relay is closed to force short circuit to occur, and then it is confirmed whether or not the electrical leakage relay is broken. After it is confirmed that the breaker relay is broken, a charging relay is closed to start charging the battery.

Patent Document 1: Japanese Patent Laying-Open No. 11-205909

DISCLOSURE OF THE INVENTION

Problems to be Solved by the Invention

Japanese Patent Laying-Open No. 11-205909 (Patent Document 1) discloses the configuration where the electrical leakage breaker is provided at a coupler that connects the vehicle and the power supply. With this configuration, however, there is a possibility that electrical leakage occurring to a charging circuit of the vehicle cannot be detected accurately. For example, in the case where the rated current of the coupler is larger than the rated current of the charging circuit (electric power line for example) of the vehicle, even if electrical leakage occurs to the vehicle's charging circuit, the value of the current flowing in the coupler may still be equal to or smaller than the rated current of the coupler. In this case, the electrical leakage breaker in the coupler may not be able to detect the electrical leakage.

An object of the present invention is to provide an abnormality detection apparatus for a vehicle that is capable of accurately detecting an abnormality of a charging circuit mounted on the vehicle for charging a power storage device that is used for driving the vehicle.

Means for Solving the Problems

In summary, the present invention is an abnormality detection apparatus for a vehicle. The vehicle includes: a power storage device for driving the vehicle; a charging inlet for receiving electric power supplied from a power supply provided externally to the vehicle; a charging circuit for charging the power storage device with the electric power from the power supply; and at least one electric power line for connecting the charging inlet and the charging circuit. The abnormality detection apparatus includes a voltage application circuit for applying a test voltage to the at least one electric power line, and a short circuit detection unit. The short circuit detection unit detects short circuit of the at least one electric power line in a case where a voltage value of the at least one electric power line, while the voltage application circuit applies the test voltage to the at least one electric power line, is out of a predetermined normal range including a value of the test voltage: The short circuit detection unit determines, based on the voltage value, which of a plurality of short circuit modes is a short circuit mode corresponding to the short circuit as detected.

Preferably, the voltage application circuit includes: a first node to which a first voltage is applied; a second node to which a second voltage lower than the first voltage is applied; and a voltage source connected to the first and second nodes for causing a voltage intermediate between the first voltage and the second voltage to be generated as the test voltage. The plurality of short circuit modes includes: a first mode corresponding to a state where the at least one electric power line is short-circuited to the first node; and a second mode corresponding to a state where the at least one electric power line is short-circuited to the second node. The short circuit detection unit determines that the short circuit mode corresponding to the short circuit is the first mode in a case where the voltage value of the at least one electric power line is larger than an upper limit of the normal range and is within a first range including a value of the first voltage, and determines that the short circuit mode corresponding the short circuit is the second mode in a case where the voltage value of the at least one electric power line is smaller than a lower limit of the normal range and is within a second range including a value of the second voltage.

Preferably, the at least one electric power line includes a first electric power line and a second electric power line. The voltage source applies, as the test voltage, a first test voltage and a second test voltage different from each other to the first electric power line and the second electric power line, respectively. The plurality of short circuit modes further includes a third mode corresponding to a state where the first electric power line is short-circuited to the second electric power line. The short circuit detection unit determines that the short circuit mode corresponding to the short circuit is the third mode in a case where both of respective voltage values of the first electric power line and the second electric power line are within a third range different from the normal range, the first range and the second range.

Preferably, the voltage source includes a first resistance circuit, a second resistance circuit, a first connection unit, and a second connection unit. The first resistance circuit is electrically connected between the first node and the at least one electric power line. The second resistance circuit is electrically connected between the second node and the at least one electric power line. The first connection unit is configured to be capable of switching between a connection state of electrically connecting the at least one electric power line to the first node via the first resistance circuit and a state of breaking electrical connection between the at least one electric power line and the first node. The second connection unit is configured to be capable of switching between a connection state of electrically connecting the at least one electric power line to the second node via the second resistance circuit and a state of breaking electrical connection between the at least one electric power line and the second node. The short circuit detection unit sets both of the first connection unit and the second connection unit in respective connection states, and accordingly obtains the voltage value of the at least one electric power line.

Preferably, the charging inlet is connected to the power supply by a coupler. The coupler includes a breaking circuit for breaking a transmission path of the electric power from the power supply to the charging inlet. In a case where the short circuit detection unit detects that the charging inlet is connected to the coupler, the short circuit detection unit controls the breaking circuit so that the transmission path is broken and sets both of the first connection unit and the second connection unit in respective connection states.

According to another aspect of the present invention, an abnormality detection apparatus for a vehicle is provided. The vehicle includes: a power storage device for driving the vehicle; a charging inlet for receiving electric power supplied from a power supply provided externally to the vehicle; a charging circuit for charging the power storage device with the electric power from the power supply; and first and second electric power lines for connecting the charging inlet and the charging circuit. The abnormality detection apparatus includes: a first node to which a first voltage is applied; a second node to which a second voltage lower than the first voltage is applied; a first resistance circuit electrically connected between the first node and the first electric power line; a second resistance circuit electrically connected between the second node and the first electric power line; a third resistance circuit electrically connected between the first node and the second electric power line; a fourth resistance circuit electrically connected between the second node and the second electric power line; and a short circuit detection unit. The short circuit detection unit detects whether short circuit occurs to the first electric power line and the second electric power line each, by determining respective voltage ranges including a first voltage value of the first electric power line and a second voltage value of the second electric power line, respectively, among a plurality of voltage ranges defined by dividing in advance a voltage range from the first voltage to the second voltage. A first resistive voltage division ratio determined by respective resistance values of the first and second resistance circuits is larger than a second resistive voltage division ratio determined by respective resistance values of the third and fourth resistance circuits. The plurality of voltage ranges includes a first normal range, a second normal range, a first abnormal range, a second abnormal range, and a third abnormal range. The first normal range is defined as a range including a value determined by the first voltage and the second voltage as well as the first resistive voltage division ratio. The second normal range is defined as a range including a value determined by the first voltage and the second voltage as well as the second resistive voltage division ratio. The first abnormal range is defined as a range from an upper limit of the first normal range to a value of the first voltage, and including a voltage value corresponding to at least one electric power line of the first and second electric power lines while the at least one electric power line is short-circuited to the first node. The second abnormal range is defined as a range from a value of the second voltage to a lower limit of the second normal range, and including a voltage value corresponding to at least one electric power line while the at least one electric power line is short-circuited to the second node. The third abnormal range is defined as a range between the first normal range and the second normal range and including the first and second voltage values while the first electric power line is short-circuited to the second electric power line.

According to still another aspect of the present invention, a vehicle is provided. The vehicle includes: a power storage device for driving the vehicle; a charging inlet for receiving electric power supplied from a power supply provided externally to the vehicle; a charging circuit for charging the power storage device with the electric power from the power supply; at least one electric power line for connecting the charging inlet and the charging circuit; a voltage application circuit for applying a test voltage to the at least one electric power line; and a short circuit detection unit. The short circuit detection unit detects short circuit of the at least one electric power line in a case where a voltage value of the at least one electric power line, while the voltage application circuit applies the test voltage to the at least one electric power line, is out of a predetermined normal range including a value of the test voltage. The short circuit detection unit determines, based on the voltage value, which of a plurality of short circuit modes is a short circuit mode corresponding to the short circuit as detected.

Preferably, the voltage application circuit includes: a first node to which a first voltage is applied; a second node to which a second voltage lower than the first voltage is applied; and a voltage source connected to the first and second nodes for causing a voltage intermediate between the first voltage and the second voltage to be generated as the test voltage. The plurality of short circuit modes includes: a first mode corresponding to a state where the at least one electric power line is short-circuited to the first node; and a second mode corresponding to a state where the at least one electric power line is short-circuited to the second node. The short circuit detection unit determines that the short circuit mode corresponding to the short circuit is the first mode in a case where the voltage value of the at least one electric power line is larger than an upper limit of the normal range and is within a first range including a value of the first voltage, and determines that the short circuit mode corresponding the short circuit is the second mode in a case where the voltage value of the at least one electric power line is smaller than a lower limit of the normal range and is within a second range including a value of the second voltage.

Preferably, the at least one electric power line includes a first electric power line and a second electric power line. The voltage source applies, as the test voltage, a first test voltage and a second test voltage different from each other to the first electric power line and the second electric power line, respectively. The plurality of short circuit modes further includes a third mode corresponding to a state where the first electric power line is short-circuited to the second electric power line. The short circuit detection unit determines that the short circuit mode corresponding to the short circuit is the third mode in a case where both of respective voltage values of the first electric power line and the second electric power line are within a third range different from the normal range, the first range and the second range.

Preferably, the voltage source includes a first resistance circuit, a second resistance circuit, a first connection unit, and a second connection unit. The first resistance circuit is electrically connected between the first node and the at least one electric power line. The second resistance circuit is electrically connected between the second node and the at least one electric power line. The first connection unit is configured to be capable of switching between a connection state of electrically connecting the at least one electric power line to the first node via the first resistance circuit and a state of breaking electrical connection between the at least one electric power line and the first node. The second connection unit is configured to be capable of switching between a connection state of electrically connecting the at least one electric power line to the second node via the second resistance circuit and a state of breaking electrical connection between the at least one electric power line and the second node. The short circuit detection unit sets both of the first connection unit and the second connection unit in respective connection states, and accordingly obtains the voltage value of the at least one electric power line.

Preferably, the charging inlet is connected to the power supply by a coupler. The coupler includes a breaking circuit for breaking a transmission path of the electric power from the power supply to the charging inlet. In a case where the short circuit detection unit detects that the charging inlet is connected to the coupler, the short circuit detection unit controls the breaking circuit so that the transmission path is broken and sets both of the first connection unit and the second connection unit in respective connection states.

According to a further aspect of the present invention, a vehicle is provided. The vehicle includes: a power storage device for driving the vehicle; a charging inlet for receiving electric power supplied from a power supply provided externally to the vehicle; a charging circuit for charging the power storage device with the electric power from the power supply; first and second electric power lines for connecting the charging inlet and the charging circuit; a first node to which a first voltage is applied; a second node to which a second voltage lower than the first voltage is applied; a first resistance circuit electrically connected between the first node and the first electric power line; a second resistance circuit electrically connected between the second node and the first electric power line; a third resistance circuit electrically connected between the first node and the second electric power line; a fourth resistance circuit electrically connected between the second node and the second electric power line; and a short circuit detection unit. The short circuit detection unit detects whether short circuit occurs to the first electric power line and the second electric power line each, by determining respective voltage ranges including a first voltage value of the first electric power line and a second voltage value of the second electric power line, respectively, among a plurality of voltage ranges defined by dividing in advance a voltage range from the first voltage to the second voltage. A first resistive voltage division ratio determined by respective resistance values of the first and second resistance circuits is larger than a second resistive voltage division ratio determined by respective resistance values of the third and fourth resistance circuits. The plurality of voltage ranges includes a first normal range, a second normal range, a first abnormal range, a second abnormal range, and a third abnormal range. The first normal range is defined as a range including a value determined by the first voltage and the second voltage as well as the first resistive voltage division ratio. The second normal range is defined as a range including a value determined by the first voltage and the second voltage as well as the second resistive voltage division ratio. The first abnormal range is defined as a range from an upper limit of the first normal range to a value of the first voltage, and including a voltage value corresponding to at least one electric power line of the first and second electric power lines while the at least one electric power line is short-circuited to the first node. The second abnormal range is defined as a range from a value of the second voltage to a lower limit of the second normal range, and including a voltage value corresponding to at least one electric power line while the at least one electric power line is short-circuited to the second node. The third abnormal range is defined as a range between the first normal range and the second normal range and including the first and second voltage values while the first electric power line is short-circuited to the second electric power line.

Effects of the Invention

The present invention can accurately detect an abnormality of a charging circuit mounted on a vehicle for charging a power storage device that is used for driving the vehicle.

Figure 1:
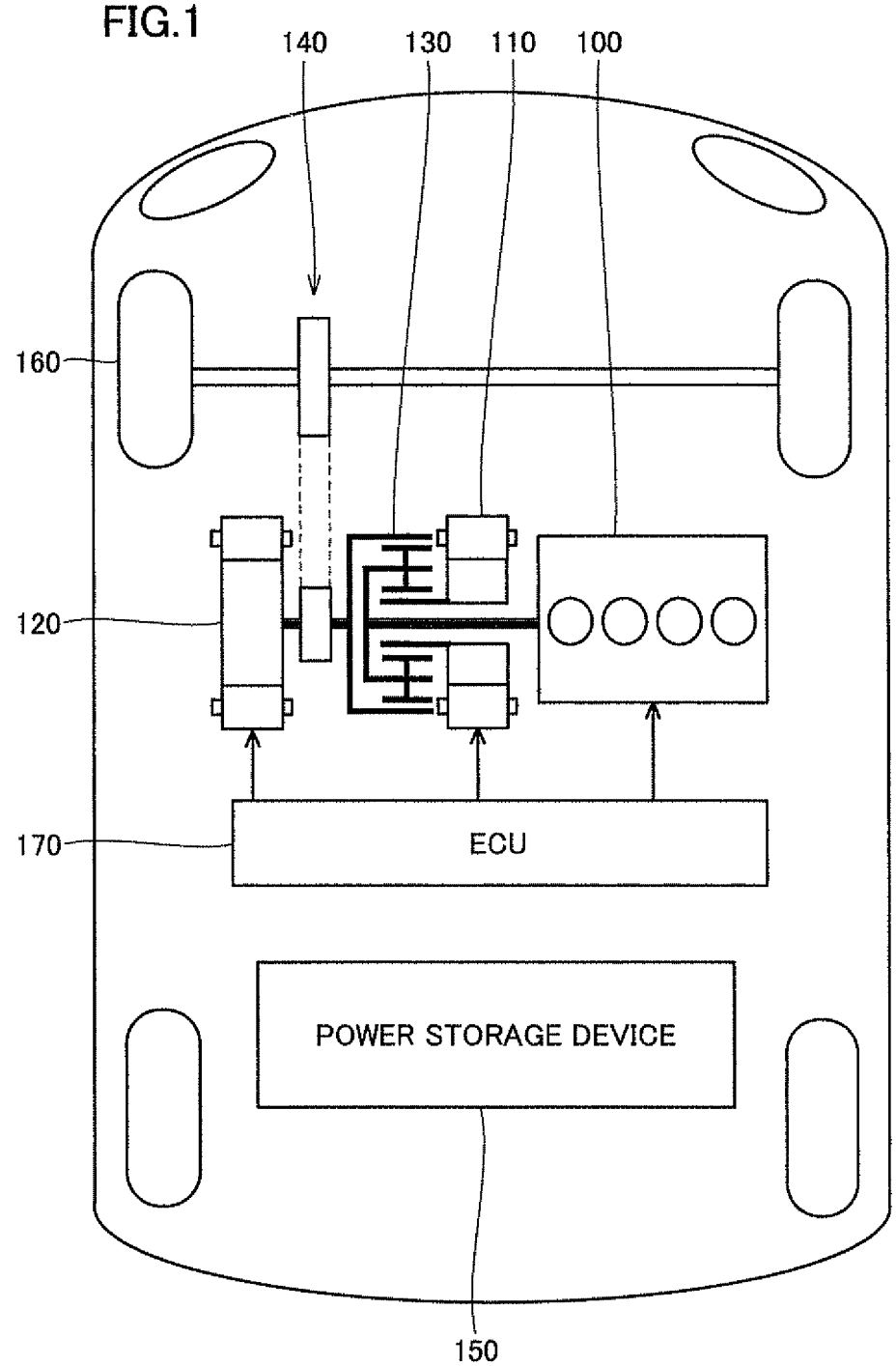
FIG. 1 is an overall block diagram of a plug-in hybrid vehicle shown as an example of a vehicle to which a vehicle abnormality detection apparatus according to an embodiment of the present invention is applied.

DESCRIPTION OF THE REFERENCE SIGNS 100 engine; 110 first MG; 120 second MG; 112, 122 neutral point; 130 power split device; 140 reduction gear; 150 power storage device; 160 drive wheel; 170 ECU; 200, 296 converter; 210, 220 inverter; 210A, 220A upper arm; 210B, 220B lower arm; 260 relay; 270 charging inlet; 281, 282 electric power line; 290 charger; 291, 604 voltage sensor; 292 current sensor; 293 voltage application circuit; 294 charging circuit; 295 rectifier circuit; 297 isolation transformer; 300 coupler; 310 connector; 312 limit switch; 320 plug; 332 relay; 334 control pilot circuit; 400 power supply outlet; 402 power supply; 502 resistance circuit; 506 voltage generation circuit; 508, 510 input buffer; 512, 514 CPU; 516, 519 power supply node; 518 vehicle earth; 602 oscillator; 606 electromagnetic coil; 608 electrical leakage detector; D1-D3 diode; L1 control pilot line; L2 earth line; L3 signal line; R1 resistor element; R2, R3, R7 pull-down resistor; R4-R6 pull-up resistor; R11-R14 resistor; SW1, SW2 switch; SW11-SW16 switch

BEST MODES FOR CARRYING OUT THE INVENTION

Embodiments of the present invention will be hereinafter described in detail with reference to the drawings. In the drawings, like or corresponding components are denoted by like reference characters, and a description thereof will not be repeated.

FIG. 1 is an overall block diagram of a plug-in hybrid vehicle shown as an example of a vehicle to which a vehicle abnormality detection apparatus according to an embodiment of the present invention is applied. Referring to FIG. 1, this plug-in hybrid vehicle includes an engine 100, a first MG (Motor Generator) 110, a second MG 120, a power split device 130, a reduction gear 140, a power storage device 150, a drive wheel 160, and an ECU (Electronic Control Unit) 170.

Engine 100, first MG 110 and second MG 120 are coupled to power split device 130. This plug-in hybrid vehicle travels by using driving force from at least one of engine 100 and second MG 120. A path for transmitting motive power generated by engine 100 is split by power split device 130 into two paths, that is, one path through which the motive power is transmitted to drive wheel 160 via reduction gear 140, and the other through which the motive power is transmitted to first MG 110.

First MG 110 is an alternating current (AC) rotating electric machine, and is a three-phase AC synchronous motor including a U-phase coil, a V-phase coil and a W-phase coil, for example. First MG 110 generates electric power by using the motive power of engine 100 split by power split device 130. For example, when the state of charge (also referred to as "SOC (State of Charge)" hereinafter) of power storage device 150 falls below a predetermined value, engine 100 starts and electric power is generated by first MG 110. The electric power generated by first MG 110 is converted from AC to DC by an inverter (described later), the voltage thereof is adjusted by a converter (described later), and then the electric power is stored in power storage device 150.

Second MG 120 is an AC rotating electric machine, and is a three-phase AC synchronous motor including a U-phase coil, a V-phase coil and a W-phase coil, for example. Second MG 120 generates driving force by using at least one of the electric power stored in power storage device 150 and the electric power generated by first MG 110. The driving force generated by second MG 120 is transmitted to drive wheel 160 via reduction gear 140. Accordingly, second MG 120 assists engine 100 or causes the vehicle to travel by using the driving force from second MG 120. Although drive wheel 160 is shown as a front wheel in FIG. 1, a rear wheel may be driven by second MG 120 instead of the front wheel or together with the front wheel.

When the brake of the vehicle is applied for example, second MG 120 is driven by drive wheel 160 via reduction gear 140. Thus, second MG 120 is operated as a generator and is further operated as a regenerative brake for converting braking energy to electric power. The electric power generated by second MG 120 is stored in power storage device 150.

Power split device 130 is formed of a planetary gear including a sun gear, a pinion gear, a carrier, and a ring gear. The pinion gear engages the sun gear and the ring gear. The carrier rotatably supports the pinion gear, and is coupled to a crankshaft of engine 100. The sun gear is coupled to a rotational shaft of first MG 110. The ring gear is coupled to a rotational shaft of second MG 120 and reduction gear 140.

Figure 2:
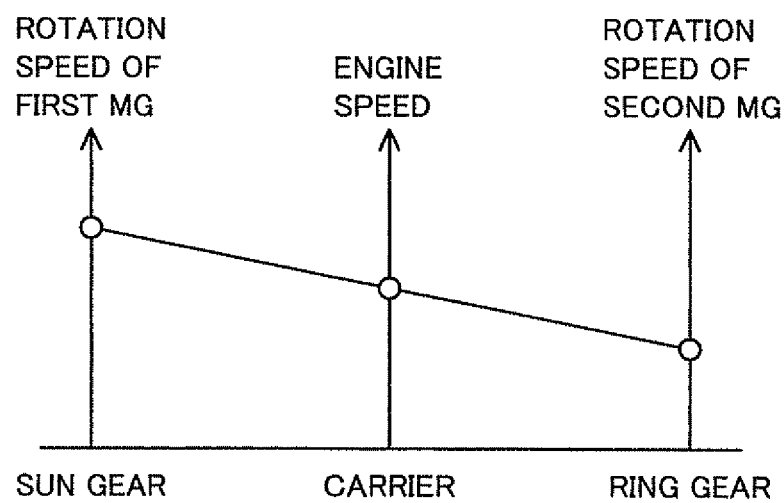
FIG. 2 shows a nomographic chart of a power split device.

Engine 100, first MG 110 and second MG 120 are coupled together via power split device 130 formed of the planetary gear, so that the relation between respective rotation speeds of engine 100, first MG 110 and second MG 120 is such that they are connected by a straight line in a nomographic chart as shown in FIG. 2.

Referring again to FIG. 1, power storage device 150 is a rechargeable DC power supply, and is formed of a secondary battery such as nickel-metal hydride and lithium ion, for example. The voltage of power storage device 150 is for example about 200 V. In addition to the electric power generated by first MG 110 and second MG 120, electric power supplied from a power supply external to the vehicle is stored in power storage device 150, as will be described hereinafter. A capacitor with a large capacitance may also be employed as power storage device 150, or any electric power buffer may be employed as long as the buffer can temporarily store the electric power generated by first MG 110 and second MG 120 as well as the electric power from the power supply external to the vehicle, and supply the stored electric power to second MG 120.

Engine 100, first MG 110 and second MG 120 are controlled by ECU 170. ECU 170 may be constituted of a plurality of ECUs. A configuration of ECU 170 will be described later herein.

Figure 3:
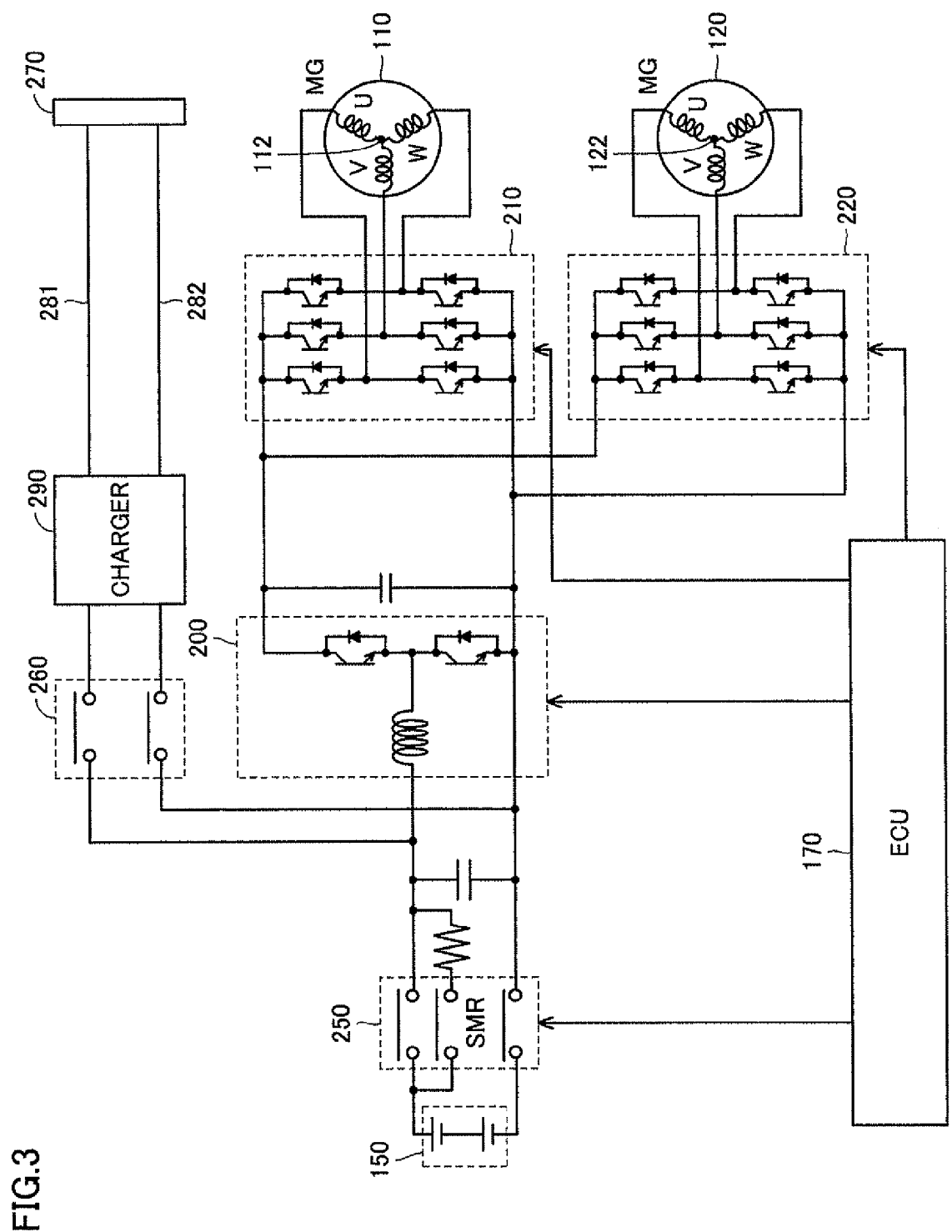
FIG. 3 is an overall configuration diagram of an electrical system in the plug-in hybrid vehicle shown in FIG. 1.

FIG. 3 is an overall configuration diagram of an electrical system in the plug-in hybrid vehicle shown in FIG. 1. Referring to FIG. 3, this electrical system includes power storage device 150, an SMR (System Main Relay) 250, a converter 200, a first inverter 210, a second inverter 220, first MG 110, second MG 120, a relay 260, a charging inlet 270, electric power lines 281, 282, and a charger 290.

SMR 250 is provided between power storage device 150 and converter 200. SMR 250 is a relay for electrically connecting/disconnecting power storage device 150 and the electrical system, and on/off of SMR 250 is controlled by ECU 170. In other words, when the vehicle travels and when power storage device 150 is charged from a power supply external to the vehicle, SMR 250 is turned on and power storage device 150 is electrically connected to the electrical system. In contrast, when the vehicle system is stopped, SMR 250 is turned off and power storage device 150 is electrically disconnected from the electrical system.

Converter 200 includes a reactor, two npn transistors and two diodes. The reactor has one end connected to the positive electrode side of power storage device 150, and the other end connected to a connection node of the two npn transistors. The two npn transistors are connected in series, and each npn transistor has the diode connected in antiparallel.

An IGBT (Insulated Gate Bipolar Transistor), for example, may be used as the npn transistor. Further, a power switching element such as power MOSFET (Metal Oxide Semiconductor Field-Effect Transistor) may be used instead of the npn transistor.

When electric power is supplied from power storage device 150 to first MG 110 or second MG 120, converter 200 steps up the electric power discharged from power storage device 150 and supplies the electric power to first MG 110 or second MG 120, based on a control signal from ECU 170. Further, when power storage device 150 is charged by storing the electric power generated by first MG 110 or second MG 120 in power storage device 150, converter 200 steps down the electric power supplied from first MG 110 or second MG 120 and outputs the electric power to power storage device 150.

First inverter 210 includes a U-phase arm, a V-phase arm and a W-phase arm. The U-phase arm, the V-phase arm and the W-phase arm are connected in parallel. Each phase arm includes two npn transistors connected in series, and each npn transistor has a diode connected in antiparallel. A connection point between the two npn transistors in each phase arm is connected to an end of a corresponding coil in first MG 110 that is different from a neutral point 112.

First inverter 210 converts DC electric power supplied from converter 200 to AC electric power, and supplies the resultant AC electric power to first MG 110. Further, first inverter 210 converts AC electric power generated by first MG 110 to DC electric power, and supplies the resultant DC electric power to converter 200.

Second inverter 220 is configured similarly to first inverter 210. A connection point between the two npn transistors in each phase arm of second inverter 220 is connected to an end of a corresponding coil in second MG 120 that is different from a neutral point 122.

Second inverter 220 converts DC electric power supplied from converter 200 to AC electric power, and supplies the resultant AC electric power to second MG 120. Further, second inverter 220 converts AC electric power generated by second MG 120 to DC electric power, and supplies the resultant DC electric power to converter 200.

Relay 260 is provided between charger 290 and a pair of electric power lines connected to the positive electrode and the negative electrode of the power storage device via SMR 250. Relay 260 is used for electrically connecting/disconnecting the pair of electric power lines and charger 290 to/from each other, and on/off of relay 260 is controlled by ECU 170. Specifically, when charger 290 is stopped, relay 260 is turned off so that the pair of electric power lines is electrically disconnected from charger 290. In contrast, when charger 290 is operated, relay 260 is turned on so that the pair of electric power lines is electrically connected to charger 290.

Charging inlet 270 is an electric power interface for receiving charging electric power from the power supply external to the vehicle, and is provided at the vehicle. When power storage device 150 is charged from the power supply external to the vehicle, the power supply external to the vehicle is connected to the vehicle by a coupler. In this case, charging inlet 270 is connected to a connector of the coupler.

Charger 290 is connected to charging inlet 270 by electric power lines 281, 282. When power storage device 150 is charged by a power supply 402, charger 290 converts the charging electric power supplied from power supply 402 to electric power appropriate for charging power storage device 150, based on a control signal from ECU 170, and outputs the resultant electric power to power storage device 150.

ECU 170 generates control signals for driving SMR 250, converter 200, first inverter 210, second inverter 220, and charger 290, and controls the operation of these devices each.

Figure 4:
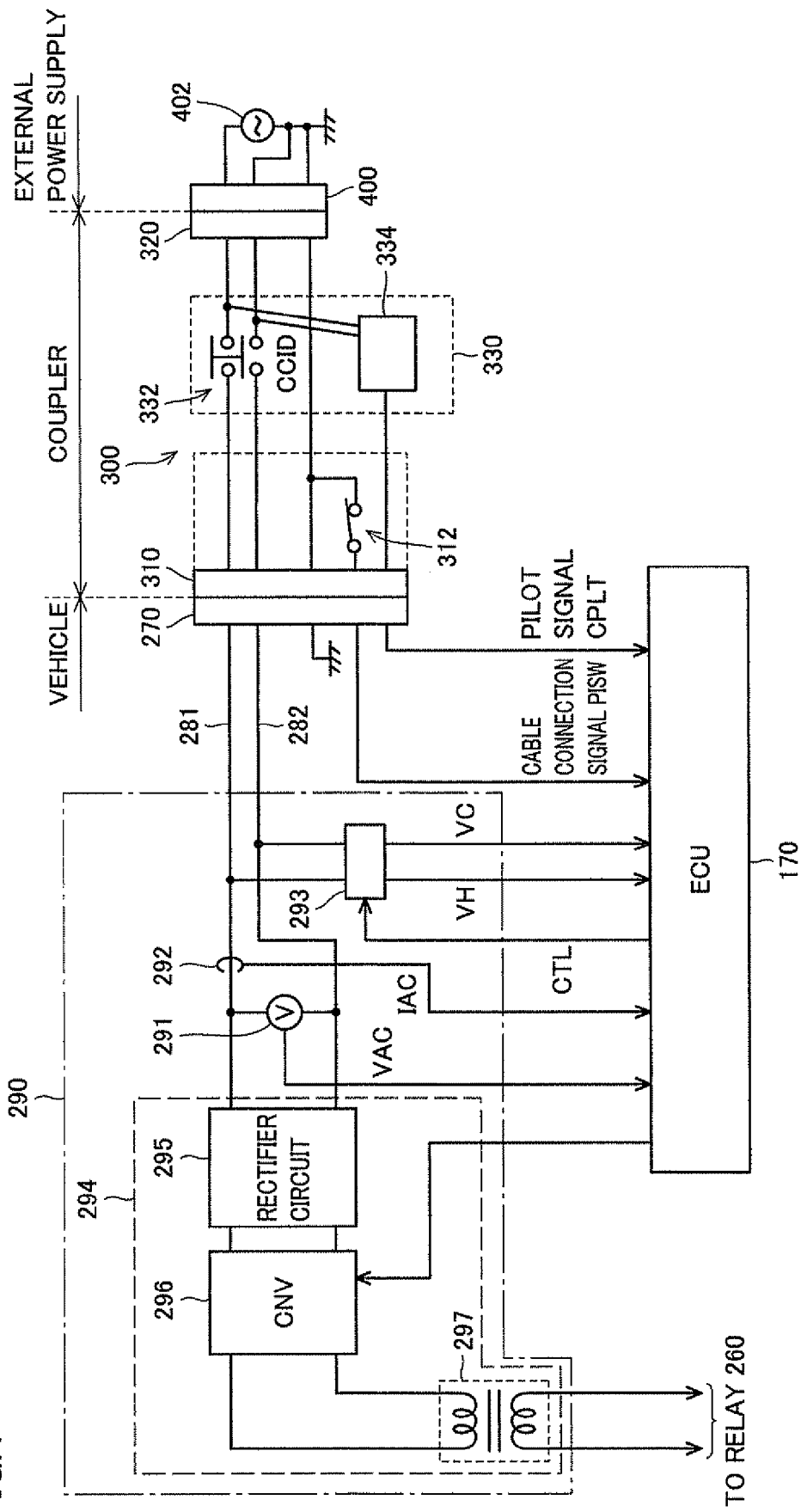
FIG. 4 illustrates in more detail a portion related to a charging mechanism for the electrical system shown in FIG. 3.

FIG. 4 illustrates in more detail a portion related to a charging mechanism for the electrical system shown in FIG. 3. Referring to FIG. 4, a coupler 300 for coupling the plug-in hybrid vehicle and the power supply external to the vehicle includes a connector 310, a plug 320 and a CCID (Charging Circuit Interrupt Device) 330.

"SAE Electric Vehicle Conductive Charge Coupler" (SAE Standards, SAE International, USA, November, 2001) defines the standards concerning a control pilot, for example. The control pilot has the capability of indicating to a vehicle that EVSE (Electric Vehicle Supply Equipment) is ready to supply energy (electric power), by sending a square wave signal (hereinafter also referred to as pilot signal) from an oscillator to a control pilot line. The EVSE is a device for coupling an external power supply and the vehicle. For example, when a plug of the EVSE is connected to the power supply external to the vehicle and a connector of the EVSE is connected to a connector provided at the vehicle, the pilot signal is output. The pulse width of the pilot signal is used to inform the plug-in vehicle of an available current capacity. Upon detecting the pilot signal, the plug-in vehicle prepares (closes the relay, for example) for start of charging. Coupler 300 corresponds to the EVSE as described above.

Connector 310 is configured so that the connector can be inserted to charging inlet 270 provided at the vehicle. A limit switch 312 is provided at connector 310. When connector 310 is inserted to charging inlet 270, limit switch 312 is turned on, and a cable connection signal PISW indicating that connector 310 is inserted to charging inlet 270 is input to ECU 170.

Plug 320 is connected to a power supply outlet 400 provided at a house, for example. AC electric power is supplied from power supply 402 (system power supply for example) to power supply outlet 400.

CCID 330 includes a relay 332 and a control pilot circuit 334. Relay 332 is provided in a pair of electric power lines through which charging electric power is supplied from power supply 402 to the plug-in hybrid vehicle. As connector 310 is inserted to charging inlet 270, the pair of electric power lines is connected to the electric power line pair constituted of electric power lines 281, 282.

On/off of relay 332 is controlled by control pilot circuit 334. When relay 332 is turned off, a path for transmitting electric power from power supply 402 to the plug-in hybrid vehicle is broken. In contrast, when relay 332 is turned on, electric power can be supplied from power supply 402 to the plug-in hybrid vehicle.

Control pilot circuit 334 corresponds to a controller for controlling the above-described EVSE. When plug 320 is connected to power supply outlet 400, control pilot circuit 334 operates using the electric power supplied from power supply 402. Control pilot circuit 334 generates pilot signal CPLT to be transmitted to ECU 170 of the vehicle via the control pilot line. When connector 310 is inserted to charging inlet 270, control pilot circuit 334 causes pilot signal CPLT to oscillate at a prescribed duty cycle. When the preparation for charging on the vehicle side is completed, control pilot circuit 334 causes relay 332 to turn on.

Control pilot circuit 334 uses the duty cycle (the ratio of the pulse width to the oscillation period) of pilot signal CPLT to inform ECU 170 of the vehicle of the rated current that can be supplied to the vehicle from power supply 402 via coupler 300.

Figure 5:
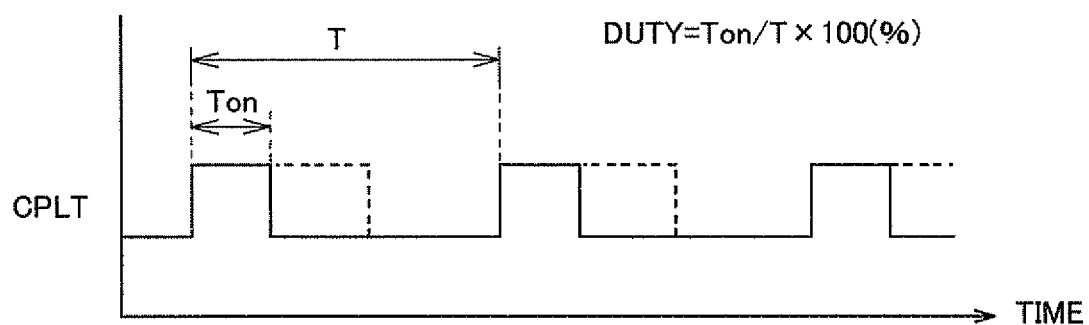
FIG. 5 shows a waveform of a pilot signal CPLT generated by a control pilot circuit 334 shown in FIG. 4.

FIG. 5 shows a waveform of pilot signal CPLT generated by control pilot circuit 334 shown in FIG. 4. Referring to FIG. 5, pilot signal CPLT oscillates with a prescribed period T. Here, a pulse width Ton of pilot signal CPLT is set based on the rated current that can be supplied from power supply 402 via coupler 300 to the vehicle. The information about the rated current is provided from control pilot circuit 334 to ECU 170 of the vehicle by using pilot signal CPLT with the duty indicated by the ratio of pulse width Ton to period T.

The rated current is defined for each coupler. Depending on the type of the coupler, the rated current varies, and therefore, the duty of pilot signal CPLT also varies. ECU 170 of the vehicle receives, through the control pilot line, pilot signal CPLT sent from control pilot circuit 334 provided at the coupler, and detects the duty of received pilot signal CPLT, so that ECU 170 can detect the rated current that can be supplied from power supply 402 via coupler 300 to the vehicle.

Referring again to FIG. 4, charger 290 includes a voltage sensor 291, a current sensor 292, a voltage application circuit 293, and a charging circuit 294. Charging circuit 294 includes a rectifier circuit 295, a converter (CNV) 296 and an isolation transformer 297.

Voltage sensor 291 detects a voltage (AC voltage) VAC between electric power lines 281 and 282, and outputs the value of the detected voltage to ECU 170. Current sensor 292 detects a current IAC flowing through electric power line 281, and outputs the value of the detected current to ECU 170. Here, current sensor 292 may be provided at electric power line 282 for detecting the current flowing through electric power line 282.

Further, in the configuration shown in FIG. 4, electric power lines 281 and 282 are electrically connected to a hot side terminal and a cold side terminal respectively of power supply outlet 400. In the following description, therefore, "AC (H) line" and "AC (C) line" refer to electric power lines 281 and 282, respectively. Here, electric power lines 281 and 282 may be connected to the cold side terminal and the hot side terminal respectively of power supply outlet 400.

In response to a control signal CTL from ECU 170, voltage application circuit 293 applies a first test voltage and a second test voltage that are different from each other to electric power lines 281 and 282, respectively. ECU 170 detects a voltage VH of electric power line 281 and a voltage VC of electric power line 282 while respective test voltages are applied to electric power lines 281 and 282 by voltage application circuit 293. Based on voltages VH, VC, ECU 170 detects whether short circuit occurs to electric power lines 281 and 282 each. Further, when ECU 170 detects that short circuit occurs to at least one of electric power lines 281 and 282, ECU 170 determines which of a plurality of short circuit modes is the short circuit mode corresponding to the detected short circuit. Namely, ECU 170 corresponds to "short circuit detection unit" of the present invention.

Rectifier circuit 295 converts the AC electric power that is input via electric power lines 281 and 282 to DC electric power. In response to a signal from ECU 170, converter 296 converts the voltage of the DC electric power that is output from rectifier circuit 295 to a predetermined voltage.

Based on voltage VAC detected by voltage sensor 291, ECU 170 calculates the ratio of the output voltage of converter 296 to the input voltage of converter 296 (conversion ratio), and controls the operation of converter 296 in accordance with the conversion ratio. Depending on the power supply to which coupler 300 is connected, the AC voltage supplied to charger 290 may vary (AC 100 V or AC 200 V for example). ECU 170 controls the conversion ratio of converter 296, so that a predetermined DC voltage can be output from converter 296, even if the AC voltage supplied to charger 290 varies depending on the power supply.

Isolation transformer 297 converts the voltage from converter 296 to a voltage appropriate for charging the power storage device. Since the voltage ratio at isolation transformer 297 is fixed, a predetermined DC voltage can be output from converter 296 to obtain a voltage appropriate for charging the power storage device.

Figure 6:
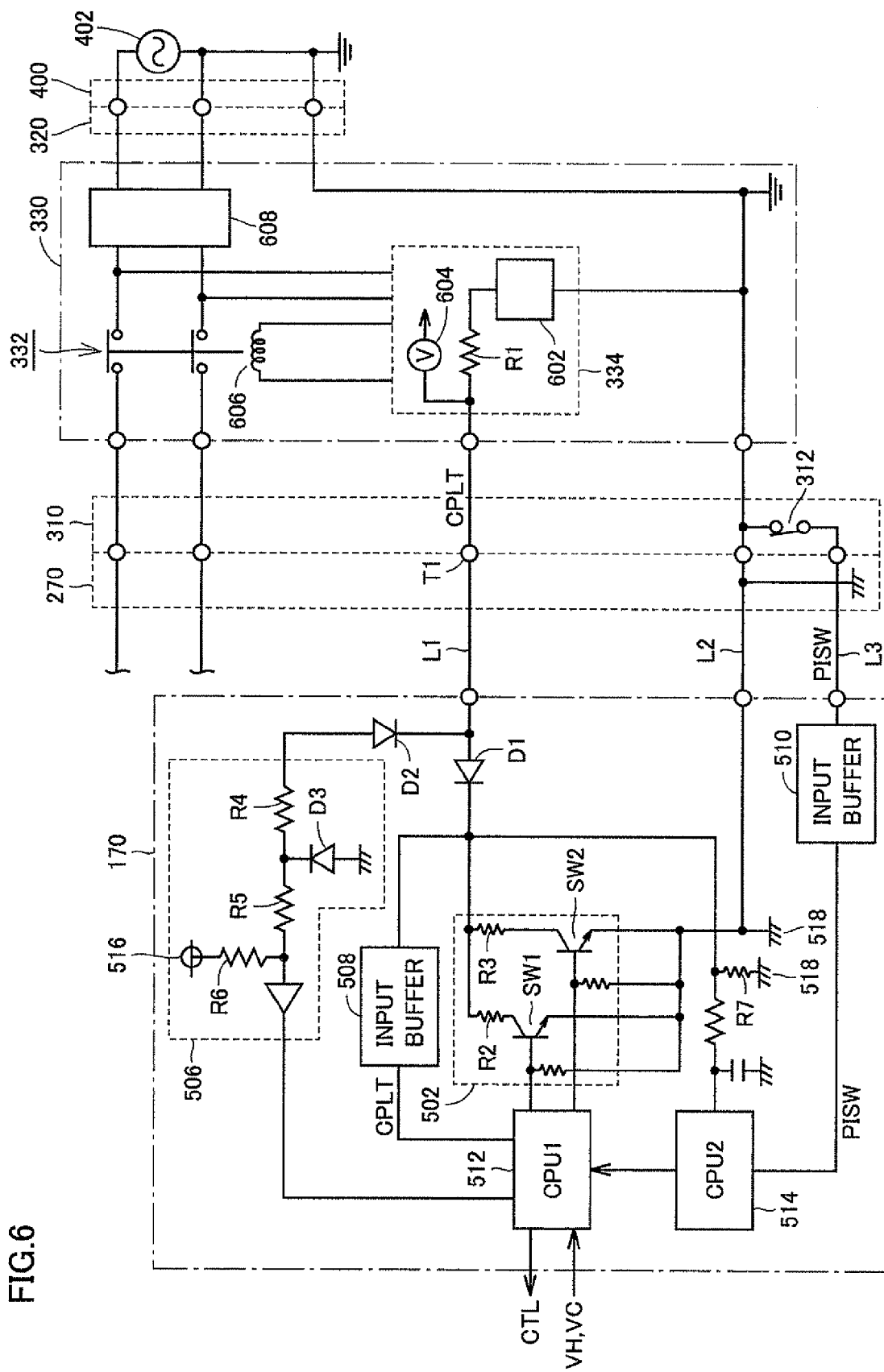
FIG. 6 illustrates in more detail the charging mechanism shown in FIG. 4.

FIG. 6 illustrates in more detail the charging mechanism shown in FIG. 4. Referring to FIG. 6, CCID 330 includes, in addition to relay 332 and control pilot circuit 334, an electromagnetic coil 606 and an electrical leakage detector 608. Control pilot circuit 334 includes an oscillator 602, a resistor element R1 and a voltage sensor 604.

Oscillator 602 is operated by the electric power supplied from power supply 402. Oscillator 602 outputs a non-oscillating signal when the potential of pilot signal CPLT detected by voltage sensor 604 is around a prescribed potential V1 (12 V for example), and outputs a signal that oscillates at a prescribed frequency (1 kHz for example) and duty cycle, when the potential of pilot signal CPLT is lowered from V1. The potential of pilot signal CPLT is manipulated by switching a resistance value of resistance circuit 502 of ECU 170 as described later. In addition, the duty cycle is set based on the rated current that can be supplied from power supply 402 via coupler 300 to the vehicle as described above.

Control pilot circuit 334 supplies a current to electromagnetic coil 606 when the potential of pilot signal CPLT is around a prescribed potential V3 (6 V for example). When the current is supplied from control pilot circuit 334, electromagnetic coil 606 generates electromagnetic force and relay 332 is turned on.

Electrical leakage detector 608 is provided at a pair of electric power lines through which charging electric power is supplied from power supply 402 to the plug-in hybrid vehicle, and detects whether or not electrical leakage occurs. Specifically, electrical leakage detector 608 detects the balance state of the currents flowing respectively through the lines of the electric power line pair in respective directions opposite to each other, and detects occurrence of electrical leakage when the balance is lost. When leakage detector 608 detects electrical leakage, electric power supply to electromagnetic coil 606 is stopped and relay 332 is turned off, which is not specifically shown.

ECU 170 includes a resistance circuit 502, a voltage generation circuit 506, input buffers 508, 510, and CPUs (Control Processing Units) 512, 514.

Resistance circuit 502 includes pull-down resistors R2, R3 and switches SW1, SW2. Pull-down resistor R2 and switch SW1 are connected in series between a vehicle earth 518 and a control pilot line L1 through which pilot signal CPLT is communicated. Pull-down resistor R3 and switch SW2 are connected in series between vehicle earth 518 and control pilot line L1, and are connected in parallel to serially-connected pull-down resistor R2 and switch SW1. Switches SW1 and SW2 are turned on/off in response to a control signal from CPU 512. Vehicle earth 518 is connected to an earth line L2.

This resistance circuit 502 switches the potential of pilot signal CPLT by turning on/off switches SW1 and SW2 in response to the control signal from CPU 512. Specifically, when switch SW2 is turned on in response to the control signal from CPU 512, the potential of pilot signal CPLT is lowered to a prescribed potential V2 (9 V for example) by pull-down resistor R3. When switch SW1 is further turned on in response to the control signal from CPU 512, the potential of pilot signal CPLT is lowered to prescribed potential V3 (6 V for example) by pull-down resistors R2 and R3.

Voltage generation circuit 506 includes a power supply node 516, pull-up resistors R4 to R6 and a diode D3. When connector 310 is not connected to charging inlet 270, this voltage generation circuit 506 generates, at control pilot line L1, a voltage determined by a voltage of power supply node

516 (12 V for example), pull-up resistors R4 to R6 and pull-down resistor R7 connected to vehicle earth 518. A diode D2 is provided between pull-up resistor R4 and control pilot line L1.

Input buffer 508 receives pilot signal CPLT of control pilot line L1 via diode D1, and outputs received pilot signal CPLT to CPU 512. Input buffer 510 receives cable connection signal PISW from a signal line L3 connected to limit switch 312 of connector 310, and outputs received cable connection signal PISW to CPU 514.

A voltage is applied to signal line L3 from ECU 170 and, when connector 310 is connected to charging inlet 270, limit switch 312 is turned on and the potential of signal line L3 is set to the ground level. Specifically, cable connection signal PISW is the L (logical low) level when connector 310 is connected to charging inlet 270, and is the H (logical high) level when connector 310 is not connected to charging inlet 270.

CPU 514 receives cable connection signal PISW from input buffer 510, and determines whether or not connector 310 is connected to charging inlet 270, based on received cable connection signal PISW. Then, CPU 514 outputs the result of the determination to CPU 512.

CPU 512 receives pilot signal CPLT from input buffer 508, and receives, from CPU 514, the result of the determination as to whether or not connector 310 is connected to charging inlet 270. When receiving the result of the determination that connector 310 is connected to charging inlet 270, CPU 512 activates the control signal to be output to switch SW2.

Further, CPU 512 outputs control signal CTL to voltage application circuit 293 (see FIG. 4) and receives voltages VH and VC. Based on voltages VH and VC, CPU 512 detects whether or not short circuit occurs to electric power lines 281 and 282 each. Furthermore, when CPU 512 detects that short circuit occurs to at least one of electric power lines 281 and 282, CPU 512 determines which of a plurality of short circuit modes is the short circuit mode corresponding to the detected short circuit, and stores the short circuit mode determined as corresponding to the detected short circuit.

When CPU 512 detects that short circuit occurs to none of electric power lines 281 and 282, CPU 512 detects the rated current that can be supplied from power supply 402 to the plug-in hybrid vehicle, based on pilot signal CPLT that starts oscillating in response to turn-on of switch SW2. When the rated current is detected and the preparation for charging power storage device 150 from power supply 402 is completed, CPU 512 further activates the control signal to be output to switch SW1, turns on relay 260 (not shown), and causes charger 290 to start operating. Charging control for power storage device 150 is thus carried out.

Figure 7:
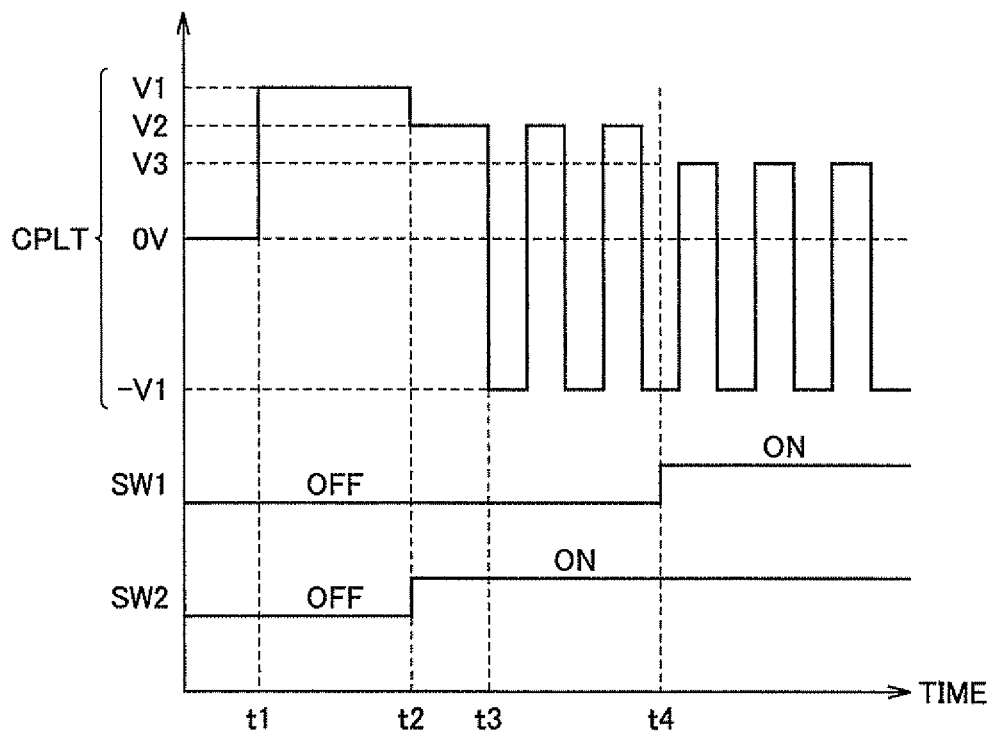
FIG. 7 is a timing chart of the pilot signal and a switch when charging is started.

FIG. 7 is a timing chart of pilot signal CPLT as well as switches SW1 and SW2 when charging is started. Referring to FIGS. 7 and 6, at time t1, plug 320 of coupler 300 is connected to power supply outlet 400 of power supply 402, and then control pilot circuit 334 receives electric power from power supply 402 and generates pilot signal CPLT.

At this time, connector 310 of coupler 300 is not connected to charging inlet 270 on the vehicle side, the potential of pilot signal CPLT is V1 (12 V for example), and pilot signal CPLT is not oscillating.

At time t2, connector 310 is connected to charging inlet 270, and then the connection between connector 310 and charging inlet 270 is detected based on cable connection signal PISW and switch SW2 is accordingly turned on. Then, the potential of pilot signal CPLT is lowered to V2 (9 V for example) by pull-down resistor R3 of resistance circuit 502.

When the potential of pilot signal CPLT is lowered to V2, control pilot circuit 334 causes pilot signal CPLT to oscillate at time t3. The rated current is detected by CPU 512 based on the duty of pilot signal CPLT and, when the preparation for control of charging is completed, switch SW1 is turned on at time 4. Then, the potential of pilot signal CPLT is further lowered to V3 (6 V for example) by pull-down resistor R2 of resistance circuit 502.

When the potential of pilot signal CPLT is lowered to V3, a current is supplied from control pilot circuit 334 to electromagnetic coil 606 and relay 332 of CCID 330 is turned on. After this, relay 260 is turned on and operation of charger 290 is started, so that power storage device 150 is charged from power supply 402, which is not specifically shown. In this way, pilot signal CPLT is used to charge power storage device 150 from power supply 402 external to the vehicle.

Further, when the potential of pilot signal CPLT is lowered to V2, voltage application circuit 293 and ECU 170 detect whether or not short circuit occurs to electric power lines 281 and 282 each and, when it is detected that short circuit occurs to at least one of electric power lines 281 and 282, it is determined which of a plurality of short circuit modes is the short circuit mode corresponding to the detected short circuit.

Figure 8:
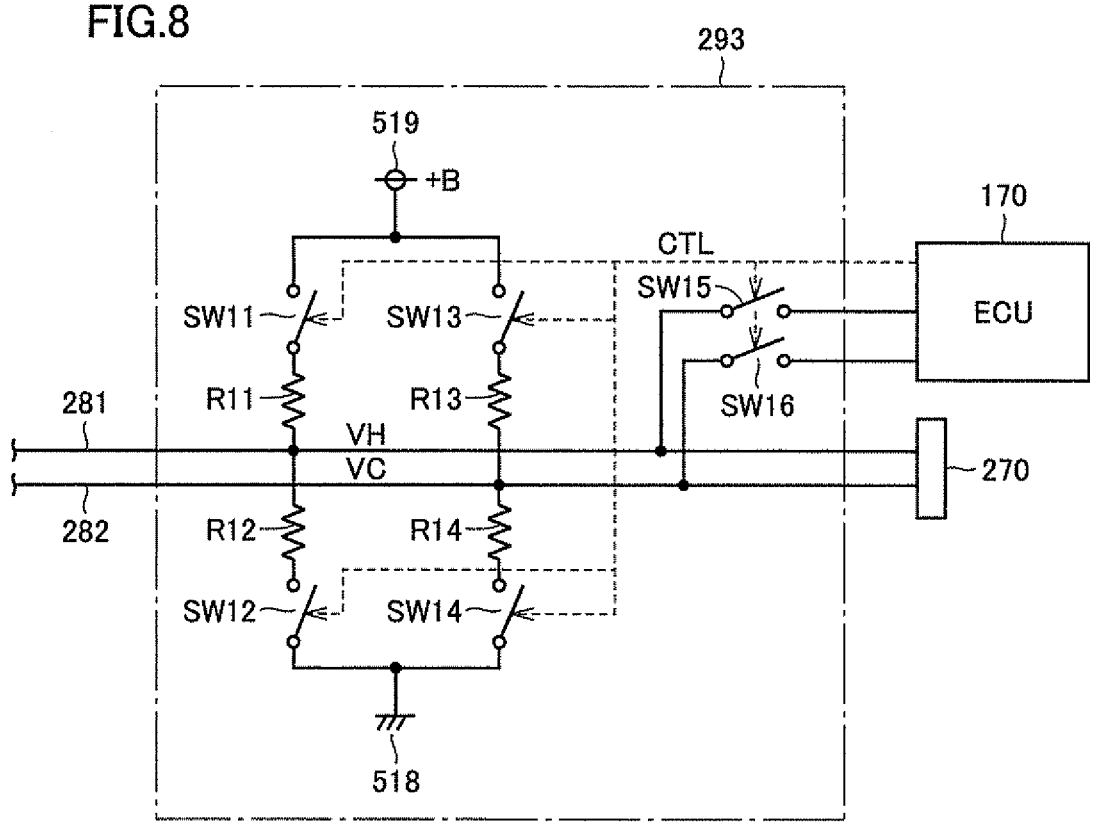
FIG. 8 is a circuit diagram showing an embodiment of a voltage application circuit 293.

FIG. 8 is a circuit diagram showing an embodiment of voltage application circuit 293. Referring to FIG. 8, voltage application circuit 293 includes a power supply node 519 to which a predetermined voltage (+B) is applied, a vehicle earth 518, resistors R11 to R14, and switches SW11 to SW16.

Switch SW11 and resistor R11 are connected in series between power supply node 519 and electric power line 281. Switch SW12 and resistor R12 are connected in series between electric power line 281 and vehicle earth 518. Switch SW13 and resistor R13 are connected in series between power supply node 519 and electric power line 282. Switch SW14 and resistor R14 are connected in series between electric power line 282 and vehicle earth 518. Resistors R11 to R14 correspond respectively to "first to fourth resistance circuits" of the present invention. Power supply node 519 and vehicle earth 518 correspond respectively to "first node" and "second node" of the present invention. Resistors R11 to R14 correspond to a voltage source for generating, as a test voltage, an intermediate voltage between the voltage (+B) and the ground voltage (0 V).

Switch SW11 (SW13) makes a switch between the state where electric power line 281 (282) is connected via resistor R11 (R13) to power supply node 519 and the state where electrical connection between electric power line 281 (282) and power supply node 519 is broken, in response to control signal CTL from ECU 170. Switch SW12 (SW14) makes a switch between the state where electric power line 281 (282) is connected via resistor R12 (R14) to vehicle earth 518 and the state where electrical connection between electric power line 281 (282) and vehicle earth 518 is broken, in response to control signal CTL from ECU 170. Although switch SW11 is provided between resistor R11 and power supply node 519, respective locations of switch SW11 and resistor R11 may be replaced with each other. The same is applied as well to switches SW12 to SW14 and resistors R12 to R14.

Switches SW11 to SW16 are turned on/off all together in response to control signal CTL from ECU 170 (more specifically CPU 512 shown in FIG. 6). Namely, switches SW11 to SW16 are all on or all off.

In the case where switches SW11 to SW14 are on, a first resistive voltage divider circuit is constituted of resistors R11 and R12 and a second resistive voltage divider circuit is constituted of resistors R13 and R14. As long as electric power line 281 normally operates, voltage VH of electric power line 281 is the voltage determined by multiplying, by the voltage (+B), a first resistive voltage division ratio (=R12/(R11+R12)) which is calculated from respective resistance values of resistor R11 and resistor R12. Likewise, as long as electric power line 282 normally operates, voltage VC of electric power line 282 is the voltage determined by multiplying, by the voltage (+B), a second resistive voltage division ratio (=R14/(R13+R14)) which is calculated from respective resistance values of resistor R13 and resistor R14.

Here, the first resistive voltage division ratio and the second resistive voltage division ratio have respective values different from each other. In the present embodiment, the first resistive voltage division ratio is higher than the second resistive voltage division ratio. As long as electric power lines 281 and 282 normally operate, voltage VH differs from voltage VC (voltage VH is higher than voltage VC).

When switches SW15 and SW16 are turned on, ECU 170 is connected to electric power lines 281 and 282. ECU 170 makes analog to digital conversion of input voltages VH and VC to obtain respective values of voltages VH and VC. In this way, ECU 170 detects voltages VH and VC.

When electric power line 281 (282) is short-circuited to power supply node 519, voltage VH (VC) is almost equal to the voltage (+B) of power supply node 519. In contrast, when electric power line 281 (282) is short-circuited to vehicle earth 518, voltage VH (VC) is almost equal to the ground voltage (0 V). Further, when one of electric power lines 281 and 282 is short-circuited to the other thereof voltage VH is equal to voltage VC and voltage VH (VC) differs from any of the voltage in the normal state (the voltage determined by the power supply voltage and the resistive voltage division ratio), the power supply voltage (+B) and the ground voltage.

ECU 170 stores a plurality of voltage ranges in advance. ECU 170 determines which of these voltage ranges is the voltage range in which the obtained voltage value is included and, based on the voltage range as determined, ECU 170 determines whether electric power line 281 (282) is normal or electric power line 281 (282) is short-circuited. Further, in the case where electric power line 281 (282) is short-circuited, ECU 170 determines a short circuit mode based on the determined voltage range. In the present embodiment, the short circuit mode is one of the short circuit modes including a mode corresponding to the state where electric power line 281 (282) is short-circuited to vehicle earth 518, a mode corresponding to the state where electric power line 281 (282) is short-circuited to power supply node 519, and a mode corresponding to the state where one of electric power lines 281 and 282 is short-circuited to the other thereof.

Figure 9:
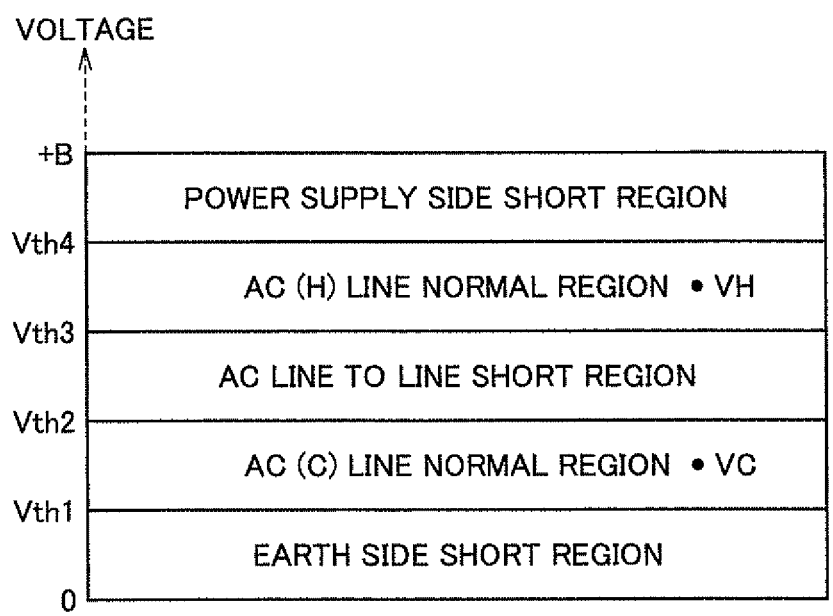
FIG. 9 shows a plurality of voltage ranges stored by an ECU 170.

FIG. 9 shows a plurality of voltage ranges stored by ECU 170. Referring to FIG. 9, the voltage range from 0 (V) to +B (V) is divided into "earth side short region", "AC (C) line normal region", "AC line to line short region", "AC (H) line normal region", and "power supply side short region". Vth1 to Vth4 are threshold values based on which it is determined which of a plurality of regions is the region including voltage VH (VC), and correspond to respective upper limits (or lower limits) of the regions, respectively.

"Earth side short region" corresponds to the voltage range from 0 (V) to Vth1 (V) and includes 0 (V). In the case where voltage VH (voltage VC) is included in this region, it is determined that electric power line 281 (282) is short-circuited to vehicle earth 518.

"AC (C) line normal region" corresponds to the voltage range from Vth1 (V) to Vth2 (V). In the case where voltage VC is included in this region, it is determine that electric power line 282 is normal.

"AC line to line short region" corresponds to the voltage range from Vth2 (V) to Vth3 (V). In the case where both of voltage VH and voltage VC are included in this region, it is determined that one of electric power lines 281 and 282 is short-circuited to the other thereof.

"AC (H) line normal region" corresponds to the voltage range from Vth3 (V) to Vth4 (V). In the case where voltage VH is included in this region, it is determined that electric power line 281 is normal.

"Power supply side short region" corresponds to the voltage range from Vth4 (V) to +B (V) and includes voltage +B (V). When voltage VH (voltage VC) is included in this region, it is determined that electric power line 281 (282) is short-circuited to power supply node 519.

Figure 10:
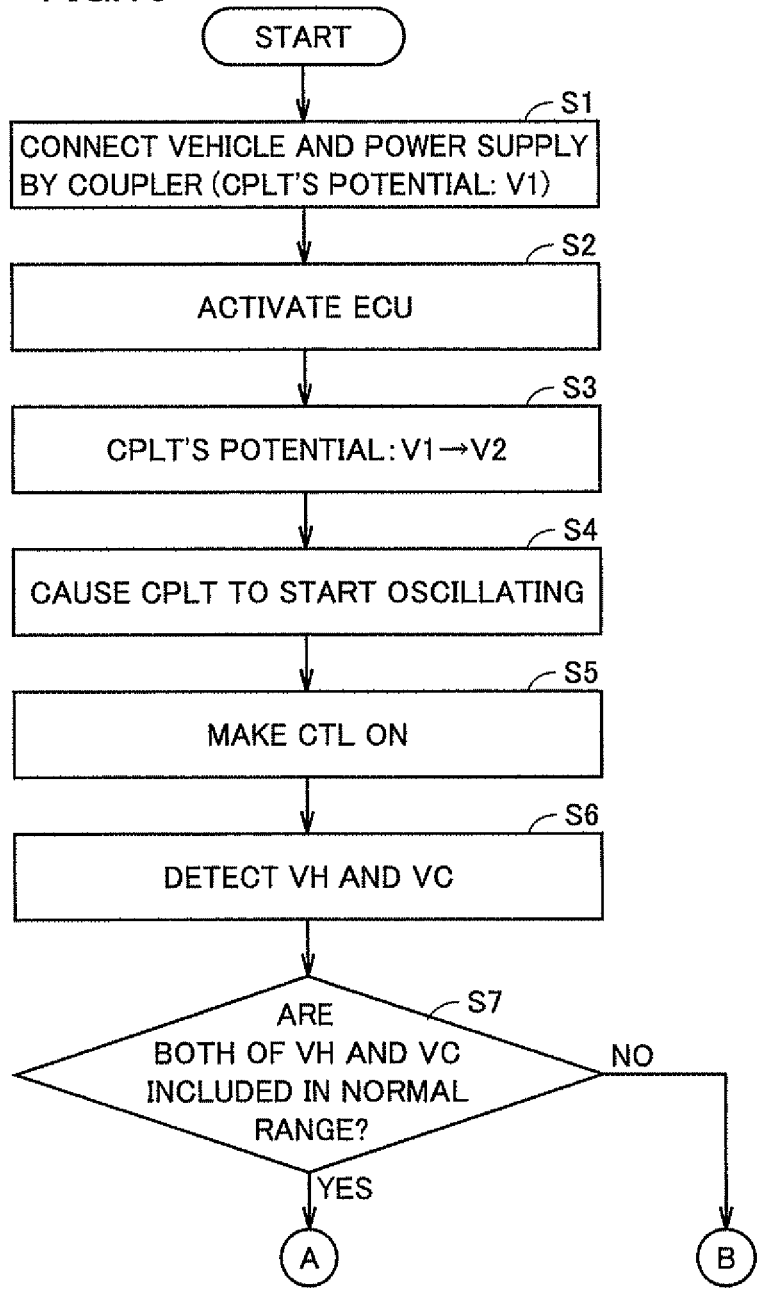
FIG. 10 is a first flowchart illustrating a charging control process and a short circuit detection process according to the present embodiment.
Figure 11:
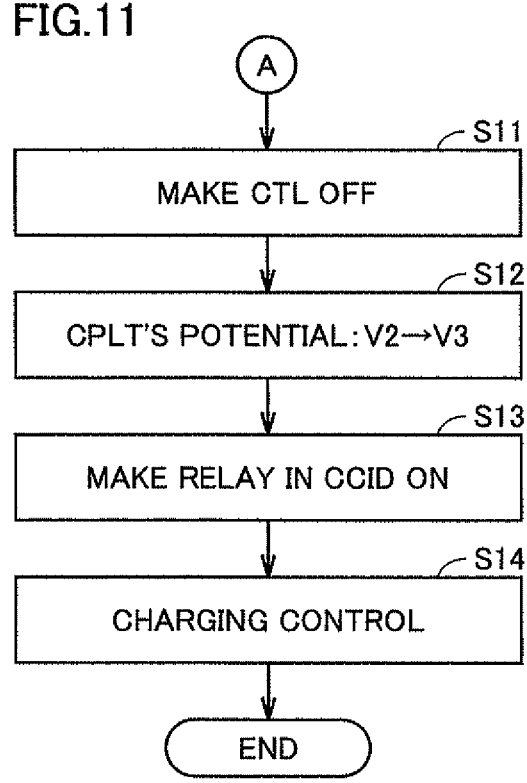
FIG. 11 is a second flowchart illustrating the charging control process and the short circuit detection process according to the present embodiment.
Figure 12:
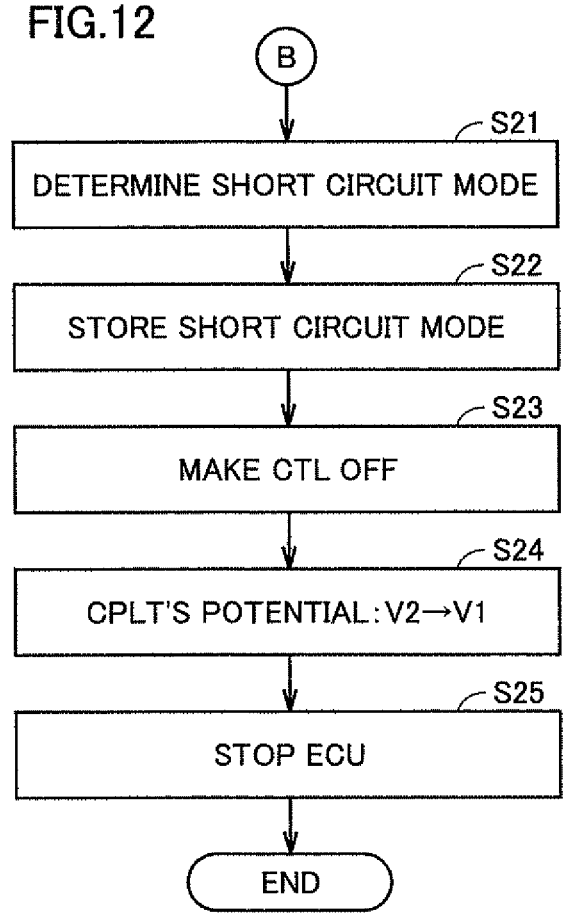
FIG. 12 is a third flowchart illustrating the charging control process and the short circuit detection process according to the present embodiment.

Referring next to FIGS. 10 to 12, a charging control process and a short circuit detection process according to the present embodiment will be described.

FIG. 10 is a first flowchart for illustrating a charging control process and a short circuit detection process according to the present embodiment.

Referring to FIG. 10, a vehicle (charging inlet 270) and power supply 402 (power supply outlet 400) are first connected via coupler 300. As coupler 300 is connected to power supply outlet 400, the potential of pilot signal CPLT that is output from control pilot circuit 334 is V1 (step S1). The operation in step S1 corresponds to the operation of control pilot circuit 334 at time t1 of FIG. 7.

Further, as coupler 300 is connected to the vehicle (charging inlet 270), ECU 170 is activated (step S2). After ECU 170 is activated, CPU 514 included in ECU 170 detects connection of connector 310 and charging inlet 270, based on cable connection signal PISW. Based on the result of detection by CPU 514, CPU 512 turns on switch SW2. Accordingly, the potential of pilot signal CPLT changes from V1 to V2 (step S3). Further, control pilot circuit 334 starts causing pilot signal CPLT to oscillate (step S4). Respective operations in steps S2 and S3 correspond to the operation of ECU 170 and the operation of control pilot circuit 334 in the period from time t1 to time t3 of FIG. 7.

While the potential of pilot signal CPLT is V2, relay 332 of CCID 330 is the off state and thus the path for transmitting electric power from power supply 402 to the plug-in hybrid vehicle is broken. Namely, when ECU 170 detects that charging inlet 270 is connected to coupler 300, ECU 170 sets the potential of pilot signal CPLT to V2 so that relay 332 of the CCID is turned off. In this way, the path for transmitting electric power from power supply 402 to the plug-in hybrid vehicle is broken.

Subsequently, ECU 170 (more specifically CPU 512) renders control signal CTL on so as to turn on switches SW11 to SW16 included in voltage application circuit 293 (step S5). ECU 170 (CPU 512) detects voltage VH of electric power line 281 and voltage VC of electric power line 282 (step S6). Since the path for transmitting electric power from power supply 402 to the plug-in hybrid vehicle is broken, voltages VH and VC are included respectively in "AC (H) line normal region" and "AC (C) line normal region" shown in FIG. 9, as long as electric power lines 281 and 282 operate normally. Thus, based on voltages VH and VC and a plurality of voltage ranges shown in FIG. 9, ECU 170 can detect short circuit of electric power lines 281 and 282. ECU 170 (CPU 512) detects whether both of voltages VH and VC are included in the normal range or at least one of voltages VH and VC is out of the normal range (step S7). The normal range of voltage VH is "AC (H) line normal region" shown in FIG. 9, and the normal range of voltage VC is "AC (C) line normal region" shown in FIG. 9.

When voltages VH and VC are included in respective normal ranges (YES in step S7), the subsequent process proceeds following the flowchart shown in FIG. 11. In the case where at least one of voltages VH and VC is out of the corresponding normal range (NO in step S7), the subsequent process proceeds following the flowchart shown in FIG. 12.

FIG. 11 is a second flowchart for illustrating the charging control process and the short circuit detection process according to the present embodiment. Referring to FIG. 11, in the case where both of voltages VH and VC are included in respective normal ranges, CPU 512 renders control signal CTL of (step S11). Then, all of switches SW11 to SW16 included in voltage application circuit 293 are turned off. Accordingly, the short circuit detection process is ended.

Next, CPU 512 detects the rated current based on the duty of pilot signal CPLT. When preparation for charging control is completed, CPU 512 turns on switch SW1 included in resistance circuit 502. The potential of pilot signal CPLT is thus changed from V2 to V3 (step S12).

The operations in steps S6, S7, S11 and S12 correspond to the operation of ECU 170 in the period from time t3 to time t4 of FIG. 7.

When control pilot circuit 334 detects that the potential of pilot signal CPLT changes from V2 to V3, control pilot circuit 334 supplies a current to electromagnetic coil 606 to turn on relay 332 in CCID 330 (step S13). ECU 170 turns on relay 260 and causes charger 290 to start operating. Thus, charging control for power storage device 150 by ECU 170 is carried out (step S14). The operations in steps S13 and S14 correspond to the process executed after time t4 of FIG. 7.

FIG. 12 is a third flowchart for illustrating the charging control process and the short circuit detection process according to the present embodiment. Referring to FIG. 12, when at least one of voltages VH and VC is out of the normal range, ECU 170 (CPU 512) detects short circuit based on voltages VH and VC. Further, based on voltages VH and VC and a plurality of voltage ranges shown in FIG. 9, CPU 512 determines which of a plurality of short circuit modes is the short circuit mode corresponding to the detected short circuit (step S21).

Next, CPU 512 stores the short circuit mode as determined (step S22). The information about the short circuit mode as determined may be stored in CPU 512, or stored in a storage device if ECU 170 includes the storage device. Further, the information about the short circuit mode as determined may be stored in a storage medium (semiconductor memory or the like for example) external to ECU 170.

Subsequently, CPU 512 renders control signal CTL off (step S23). Thus, switches SW11 to SW16 included in voltage application circuit 293 are all turned off. Accordingly, the process for detecting whether or not short circuit occurs and the process for determining a short circuit mode are ended.

Subsequently, CPU 512 turns off switch SW2. Thus, the potential of pilot signal CPLT changes from V2 to V1 (step S24). Further, ECU 170 (CPU 512) stops the operation of the ECU (CPU) itself (step S25). In this case, power storage device 150 is not charged.

According to the present embodiment as heretofore described, the abnormality detection apparatus for a vehicle includes voltage application circuit 293 for applying first and second test voltages to electric power lines 281 and 282, and ECU 170 that is a short circuit detection unit. ECU 170 detects short circuit of electric power line 281 (282) when the voltage value of electric power line 281 (282) is out of the normal range including the value of a test voltage while the test voltage is applied to electric power lines 281 and 282 by voltage application circuit 293 (switches SW11 to SW14 are on). Further, based on this voltage value, ECU 170 determines which of a plurality of short circuit modes is the short circuit mode corresponding to the detected short circuit.

Here, as shown in FIG. 6, coupler 300 also includes electrical leakage detector 608. Therefore, this electrical leakage detector 608 may be used to detect short circuit of electric power lines 281 and 282. The rated current, however, is different depending on the coupler as described above and therefore, there is a possibility that a coupler having a larger current capacity than the current capacity of electric power lines 281 and 282 is connected between the vehicle and the power supply outlet. In the case where a current larger than the rated current of the coupler flows due to short circuit of any of electric power lines 281 and 282, the electrical leakage detector provided at the coupler will be able to detect the short circuit. Even if a current larger than the rated current of electric power lines 281 and 282 flows, however, it will not be easy for the electrical leakage detector provided at the coupler to detect the short circuit, as long as the current is smaller than the rated current of the coupler.

In terms of prevention of damage to electric power lines 281 and 282 due to electrical leakage, a fuse may be inserted to electric power lines 281 or 282. When the fuse is blown, however, the troublesome exchange of the fuse is required. Moreover, it is not easy to determine, based on the blown fuse, which of the short circuit modes has caused the electrical leakage.

The abnormality detection apparatus according to the present embodiment is configured in the above-described manner, so that short circuit of an electric power line connected to the charging inlet and to the charger can be directly detected. Further, the abnormality detection circuit according to the present embodiment determines which of a plurality of short circuit modes corresponds to the detected short circuit, and thus the accuracy in detection of short circuit is ensured.

It should be noted that the short circuit detection process is not limited to the process executed when the coupler and the charging inlet are connected, and may be executed regularly or all the time while the coupler is not connected to the charging inlet (while the vehicle is traveling for example).

Figure 13:
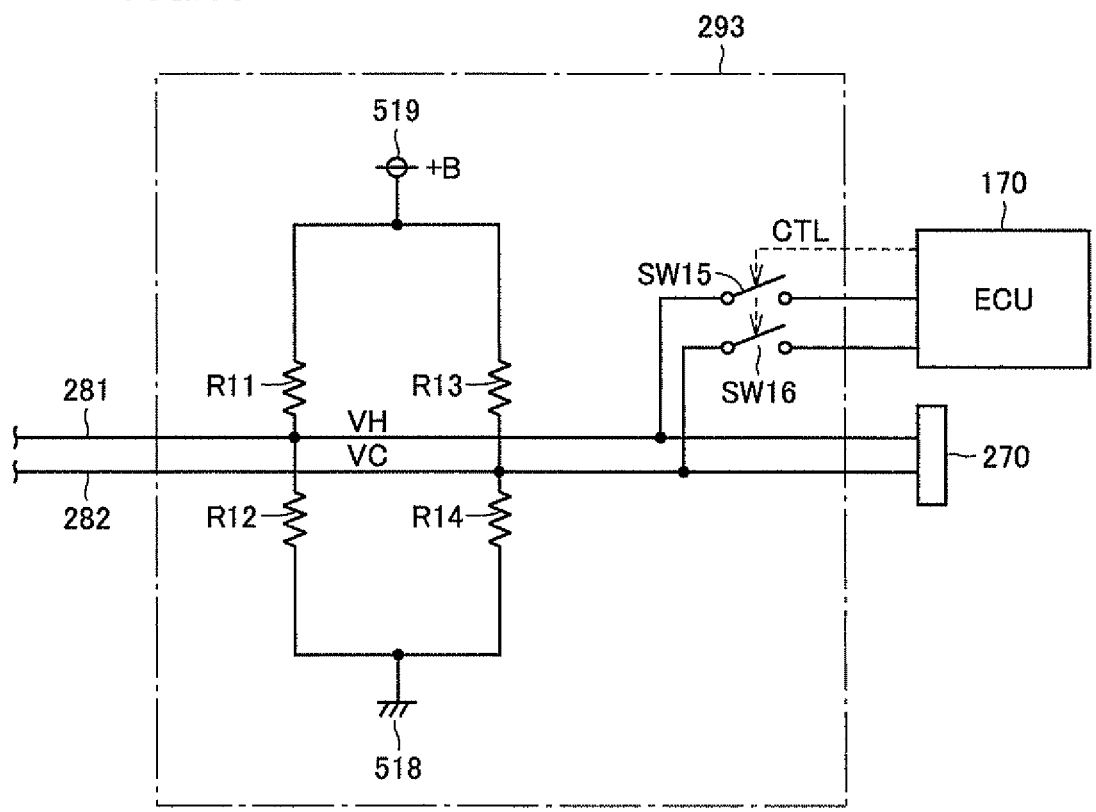
FIG. 13 is a circuit diagram showing another example of the configuration of voltage application circuit 293.

Further, the configuration of voltage application circuit 293 is not limited to the configuration shown in FIG. 8. For example, in the case where the impedance of resistors R11 to R14 is sufficiently high, the configuration shown in FIG. 13 may be employed. The configuration shown in FIG. 13 differs from the configuration shown in FIG. 8 in that the former is not provided with switches SW11 to SW14. In the configuration of FIG. 13, although a current flows through resistors R11 to R14 when an AC voltage is applied to electric power lines 281 and 282, the impedance of each resistor is sufficiently high and thus the current is small. Therefore, the influence on the vehicle's electrical system in the present embodiment will be small.

Furthermore, CPU 512 may perform a process for informing a user of the fact that short circuit is detected. How to inform the user of the short circuit is not limited to a particular one. For example, a lamp of an LED (light emitting diode) or the like may be lit.

Furthermore, according to the description above, the AC electric power from power supply 402 is converted by charger 290 to the DC electric power with which power storage device 150 is charged. It should be noted that, as shown in FIG. 14, power storage device 150 may be charged by providing the AC electric power from power supply 402 to neutral point 112 of the first MG and neutral point 122 of the second MG so that first and second inverters 210 and 220 and first and second MGs 110 and 120 operate as a single phase PWM converter.

Figure 14:
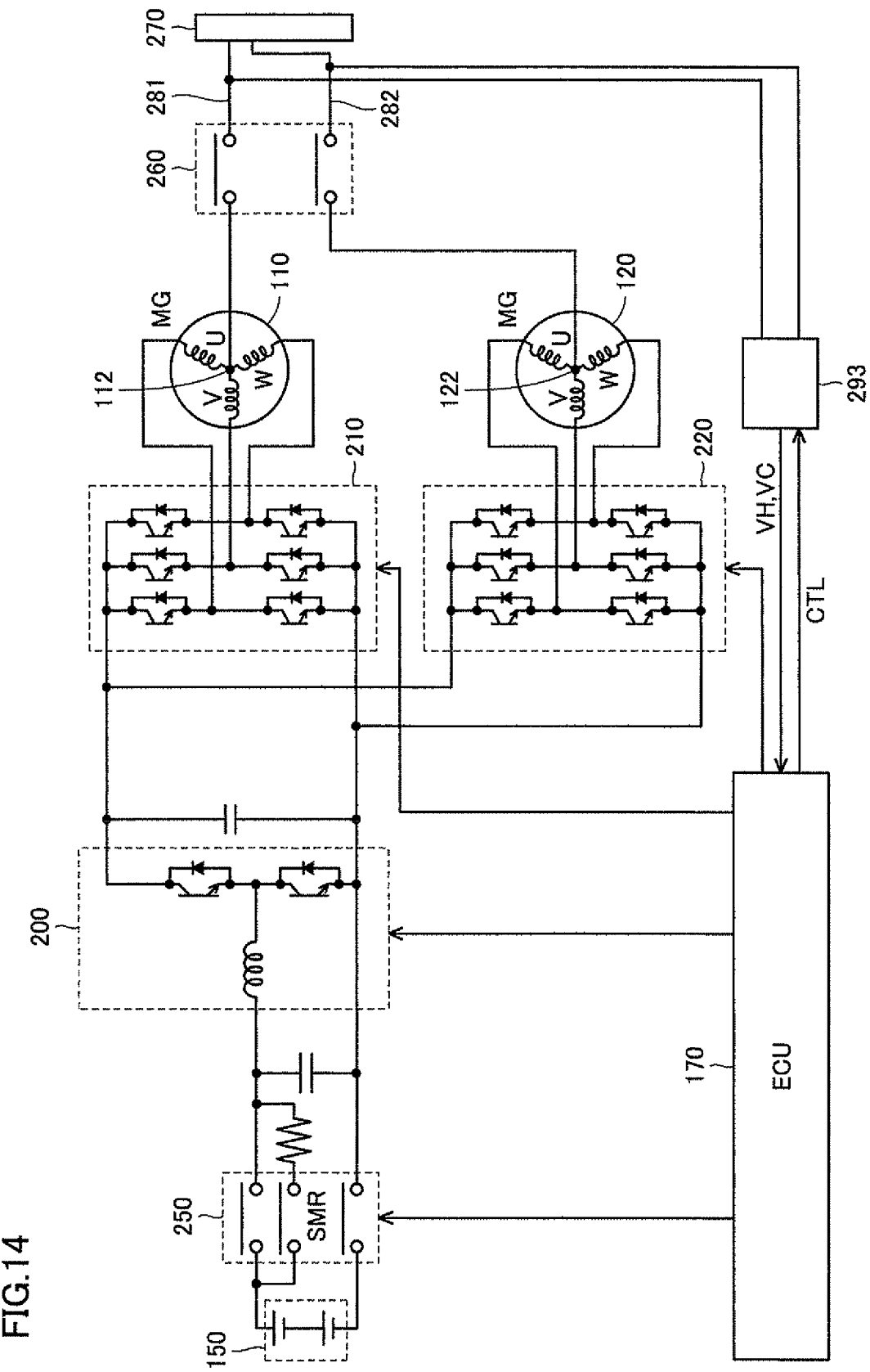
FIG. 14 shows another example of the configuration for charging a power storage device mounted on a vehicle according to the present embodiment.
Figure 15:
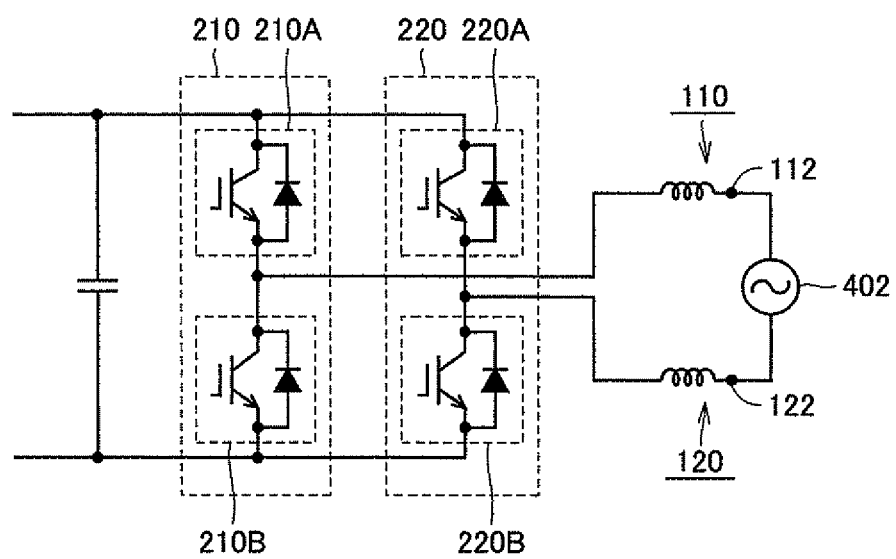
FIG. 15 shows a zero-phase equivalent circuit of first and second inverters 210, 220 and first and second MGs 110, 120 shown in FIG. 14.

FIG. 15 shows a zero-phase equivalent circuit of first and second inverters 210 and 220 as well as first and second MGs 110 and 120 shown in FIG. 14. Each of first inverter 210 and second inverter 220 is formed of a three-phase bridge circuit as shown in FIG. 14, and there are eight patterns of on/off combinations of six switching elements in each inverter. In the two of the eight switching patterns, a phase to phase voltage is zero, and such a voltage state is referred to as a zero voltage vector. The zero voltage vector can be understood as follows. The switching elements included in the upper arm of each phase are in the same switching state (all on or off), and similarly, the switching elements included in the lower arm of each phase are in the same switching state.

While power storage device 150 is charged from power supply 402 external to the vehicle, the zero voltage vector is controlled in at least one of first and second inverters 210 and 220, based on a zero-phase voltage command. The zero-phase voltage command is generated from the voltage between electric power lines 281 and 282 detected by a voltage sensor and the rated current whose information is given from coupler 300 by pilot signal CPLT, for example. In FIG. 15, the three switching elements of the upper arm of first inverter 210 are collectively shown as an upper arm 210A, and the three switching elements of the lower arm of first inverter 210 are collectively shown as a lower arm 210B. Likewise, the three switching elements of the upper arm of second inverter 220 are collectively shown as an upper arm 220A, and the three switching elements of the lower arm of second inverter 220 are collectively shown as lower arm 220B.

As shown in FIG. 15, this zero-phase equivalent circuit can be regarded as a single-phase PWM converter that receives input of the single-phase AC electric power provided from power supply 402 to neutral point 112 of first MG 110 and neutral point 122 of second MG 120. Accordingly, by changing the zero voltage vector in at least one of first and second inverters 210 and 220 based on the zero-phase voltage command and controlling switching of first and second inverters 210 and 220 so that first and second inverters 210 and 220 operate as the arms of the single-phase PWM converter, the AC electric power supplied from power supply 402 can be converted to DC electric power with which power storage device 150 can be charged. Namely, in the case where power storage device 150 is charged in accordance with the control illustrated in FIGS. 14 and 15, first and second MGs 110 and 120 and first and second inverters 210 and 220 constitute "charging circuit" of the present invention.

Electric power line 281 connects neutral point 112 and charging inlet 270. Electric power line 282 connects neutral point 122 and charging inlet 270. Like the configuration shown in FIG. 4, voltage application circuit 293 applies first and second test voltages different from each other to electric power lines 281 and 282, respectively, in response to control signal CTL from ECU 170. While voltage application circuit 293 applies the test voltages to electric power lines 281 and 282 respectively, ECU 170 detects voltage VH of electric power line 281 and voltage VC of electric power line 282. With the configuration shown in FIG. 14 as well, ECU 170 can determine whether short circuit occurs or not to electric power lines 281 and 282 each, based on voltages VH and VC. Further, in the case where ECU 170 detects that short circuit occurs to at least one of electric power lines 281 and 282, ECU 170 can determine which of a plurality of short circuit modes is the short circuit mode corresponding to the detected short circuit.

The present invention is also applicable to a hybrid vehicle without converter 200. Further, although the embodiment above has been described in connection with the series/parallel hybrid vehicle capable of splitting the motive power of engine 100 by power split device 130 so that the motive power can be transmitted to drive wheel 160 and first MG 110, the present invention is applicable as well to hybrid vehicles of other types. Specifically, for example, the present invention is also applicable to vehicles such as a so-called series hybrid vehicle using only engine 100 for driving first MG 110 and using only second MG 120 for generating driving force for the vehicle, a hybrid vehicle recovering, as electrical energy, only the regenerative energy from the kinetic energy generated by engine 100, and a motor-assisted hybrid vehicle using the engine as a main motive power source and assisted by a motor as required.

Furthermore, the present invention is also applicable to vehicles such as an electric vehicle without engine 100 that travels using electric power only, and a fuel cell vehicle including a fuel cell as an electric power source in addition to a power storage device.

It should be construed that embodiments disclosed herein are by way of illustration in all respects, not by way of limitation. It is intended that the scope of the present invention is defined by claims, not by the above description of the embodiments, and includes all modifications and variations equivalent in meaning and scope to the claims.

The invention claimed is:

1. An abnormality detection apparatus for a vehicle, said vehicle including: a power storage device for driving said vehicle; a charging inlet for receiving electric power supplied from a power supply provided externally to said vehicle; a charging circuit for charging said power storage device with said electric power from said power supply; and at least one electric power line for connecting said charging inlet and said charging circuit, and said abnormality detection apparatus comprising:
a voltage application circuit for applying a test voltage to said at least one electric power line; and
a short circuit detection unit for detecting short circuit of said at least one electric power line in a case where a voltage value of said at least one electric power line, while said voltage application circuit applies said test voltage to said at least one electric power line, is out of a predetermined normal range including a value of said test voltage, and for determining, based on said voltage value, which of a plurality of short circuit modes is a short circuit mode corresponding to said short circuit as detected,
wherein said voltage application circuit includes:
a first node to which a first voltage is applied;
a second node to which a second voltage lower than said first voltage is applied; and
a voltage source connected to said first and second nodes for causing a voltage intermediate between said first voltage and said second voltage to be generated as said test voltage,
said plurality of short circuit modes includes:
a first mode corresponding to a state where said at least one electric power line is short-circuited to said first node; and
a second mode corresponding to a state where said at least one electric power line is short-circuited to said second node, and
said short circuit detection unit determines that said short circuit mode corresponding to said short circuit is said first mode in a case where said voltage value of said at least one electric power line is larger than an upper limit of said normal range and is within a first range including a value of said first voltage, and determines that said short circuit mode corresponding said short circuit is said second mode in a case where said voltage value of said at least one electric power line is smaller than a lower limit of said normal range and is within a second range including a value of said second voltage.

2. The abnormality detection apparatus for a vehicle according to claim 1, wherein
said at least one electric power line includes:
a first electric power line; and
a second electric power line,
said voltage source applies, as said test voltage, a first test voltage and a second test voltage different from each other to said first electric power line and said second electric power line, respectively,
said plurality of short circuit modes further includes a third mode corresponding to a state where said first electric power line is short-circuited to said second electric power line, and
said short circuit detection unit determines that said short circuit mode corresponding to said short circuit is said third mode in a case where both of respective voltage values of said first electric power line and said second electric power line are within a third range different from said normal range, said first range and said second range.

3. The abnormality detection apparatus for a vehicle according to claim 2, wherein
said voltage source includes:
a first resistance circuit electrically connected between said first node and said at least one electric power line;
a second resistance circuit electrically connected between said second node and said at least one electric power line;
a first connection unit configured to be capable of switching between a connection state of electrically connecting said at least one electric power line to said first node via said first resistance circuit and a state of breaking electrical connection between said at least one electric power line and said first node; and
a second connection unit configured to be capable of switching between a connection state of electrically connecting said at least one electric power line to said second node via said second resistance circuit and a state of breaking electrical connection between said at least one electric power line and said second node, and
said short circuit detection unit sets both of said first connection unit and said second connection unit in respective connection states, and accordingly obtains said voltage value of said at least one electric power line.

4. The abnormality detection apparatus for a vehicle according to claim 3, wherein
said charging inlet is connected to said power supply by a coupler,
said coupler includes a breaking circuit for breaking a transmission path of said electric power from said power supply to said charging inlet, and
in a case where said short circuit detection unit detects that said charging inlet is connected to said coupler, said short circuit detection unit controls said breaking circuit so that said transmission path is broken and sets both of said first connection unit and said second connection unit in respective connection states.

5. An abnormality detection apparatus for a vehicle, said vehicle including: a power storage device for driving said vehicle; a charging inlet for receiving electric power supplied from a power supply provided externally to said vehicle; a charging circuit for charging said power storage device with said electric power from said power supply; and first and second electric power lines for connecting said charging inlet and said charging circuit, and
said abnormality detection apparatus comprising:
a first node to which a first voltage is applied;
a second node to which a second voltage lower than said first voltage is applied;
a first resistance circuit electrically connected between said first node and said first electric power line;
a second resistance circuit electrically connected between said second node and said first electric power line;
a third resistance circuit electrically connected between said first node and said second electric power line;
a fourth resistance circuit electrically connected between said second node and said second electric power line; and
a short circuit detection unit for detecting whether short circuit occurs to said first electric power line and said second electric power line each, by determining respective voltage ranges including a first voltage value of said first electric power line and a second voltage value of said second electric power line, respectively, among a plurality of voltage ranges defined by dividing in advance a voltage range from said first voltage to said second voltage,
a first resistive voltage division ratio determined by respective resistance values of said first and second resistance circuits being larger than a second resistive voltage division ratio determined by respective resistance values of said third and fourth resistance circuits, and
said plurality of voltage ranges including:
a first normal range defined as a range including a value determined by said first voltage and said second voltage as well as said first resistive voltage division ratio;
a second normal range defined as a range including a value determined by said first voltage and said second voltage as well as said second resistive voltage division ratio;
a first abnormal range defined as a range from an upper limit of said first normal range to a value of said first voltage, and including a voltage value corresponding to at least one electric power line of said first and second electric power lines while said at least one electric power line is short-circuited to said first node;
a second abnormal range defined as a range from a value of said second voltage to a lower limit of said second normal range, and including a voltage value corresponding to at least one electric power line while said at least one electric power line is short-circuited to said second node; and
a third abnormal range defined as a range between said first normal range and said second normal range and including said first and second voltage values while said first electric power line is short-circuited to said second electric power line.

6. A vehicle comprising:
a power storage device for driving said vehicle;
a charging inlet for receiving electric power supplied from a power supply provided externally to said vehicle;
a charging circuit for charging said power storage device with said electric power from said power supply;
at least one electric power line for connecting said charging inlet and said charging circuit;
a voltage application circuit for applying a test voltage to said at least one electric power line; and
a short circuit detection unit for detecting short circuit of said at least one electric power line in a case where a voltage value of said at least one electric power line, while said voltage application circuit applies said test voltage to said at least one electric power line, is out of a predetermined normal range including a value of said test voltage, and for determining, based on said voltage value, which of a plurality of short circuit modes is a short circuit mode corresponding to said short circuit as detected, wherein said voltage application circuit includes:

a first node to which a first voltage is applied;

a second node to which a second voltage lower than said first voltage is applied; and a voltage source connected to said first and second nodes for causing a voltage intermediate between said first voltage and said second voltage to be generated as said test voltage, said plurality of short circuit modes includes:

a first mode corresponding to a state where said at least one electric power line is short-circuited to said first node; and a second mode corresponding to a state where said at least one electric power line is short-circuited to said second node, and said short circuit detection unit determines that said short circuit mode corresponding to said short circuit is said first mode in a case where said voltage value of said at least one electric power line is larger than an upper limit of said normal range and is within a first range including a value of said first voltage, and determines that said short circuit mode corresponding said short circuit is said second mode in a case where said voltage value of said at least one electric power line is smaller than a lower limit of said normal range and is within a second range including a value of said second voltage.

7. The vehicle according to claim 6, wherein
said at least one electric power line includes:
a first electric power line; and
a second electric power line,
said voltage source applies, as said test voltage, a first test voltage and a second test voltage different from each other to said first electric power line and said second electric power line, respectively,
said plurality of short circuit modes further includes a third mode corresponding to a state where said first electric power line is short-circuited to said second electric power line, and
said short circuit detection unit determines that said short circuit mode corresponding to said short circuit is said third mode in a case where both of respective voltage values of said first electric power line and said second electric power line are within a third range different from said normal range, said first range and said second range.

8. The vehicle according to claim 7, wherein
said voltage source includes:
a first resistance circuit electrically connected between said first node and said at least one electric power line;
a second resistance circuit electrically connected between said second node and said at least one electric power line;
a first connection unit configured to be capable of switching between a connection state of electrically connecting said at least one electric power line to said first node via said first resistance circuit and a state of breaking electrical connection between said at least one electric power line and said first node; and
a second connection unit configured to be capable of switching between a connection state of electrically connecting said at least one electric power line to said second node via said second resistance circuit and a state of breaking electrical connection between said at least one electric power line and said second node, and said short circuit detection unit sets both of said first connection unit and said second connection unit in respective connection states, and accordingly obtains said voltage value of said at least one electric power line.

9. The vehicle according to claim 8, wherein
said charging inlet is connected to said power supply by a coupler,
said coupler includes a breaking circuit for breaking a transmission path of said electric power from said power supply to said charging inlet, and
in a case where said short circuit detection unit detects that said charging inlet is connected to said coupler, said short circuit detection unit controls said breaking circuit so that said transmission path is broken and sets both of said first connection unit and said second connection unit in respective connection states.

10. A vehicle comprising:
a power storage device for driving said vehicle;
a charging inlet for receiving electric power supplied from a power supply provided externally to said vehicle;
a charging circuit for charging said power storage device with said electric power from said power supply;
first and second electric power lines for connecting said charging inlet and said charging circuit;
a first node to which a first voltage is applied;
a second node to which a second voltage lower than said first voltage is applied;
a first resistance circuit electrically connected between said first node and said first electric power line;
a second resistance circuit electrically connected between said second node and said first electric power line;
a third resistance circuit electrically connected between said first node and said second electric power line;
a fourth resistance circuit electrically connected between said second node and said second electric power line; and
a short circuit detection unit for detecting whether short circuit occurs to said first electric power line and said second electric power line each, by determining respective voltage ranges including a first voltage value of said first electric power line and a second voltage value of said second electric power line, respectively, among a plurality of voltage ranges defined by dividing in advance a voltage range from said first voltage to said second voltage,
a first resistive voltage division ratio determined by respective resistance values of said first and second resistance circuits being larger than a second resistive voltage division ratio determined by respective resistance values of said third and fourth resistance circuits, and
said plurality of voltage ranges including:
a first normal range defined as a range including a value determined by said first voltage and said second voltage as well as said first resistive voltage division ratio;
a second normal range defined as a range including a value determined by said first voltage and said second voltage as well as said second resistive voltage division ratio;
a first abnormal range defined as a range from an upper limit of said first normal range to a value of said first voltage, and including a voltage value corresponding to at least one electric power line of said first and second electric power lines while said at least one electric power line is short-circuited to said first node;

a second abnormal range defined as a range from a value of said second voltage to a lower limit of said second normal range, and including a voltage value corresponding to at least one electric power line while said at least one electric power line is short-circuited to said second node; and a third abnormal range defined as a range between said first normal range and said second normal range and including said first and second voltage values while said first electric power line is short-circuited to said second electric power line.

\* \* \* \* \*